(12) United States Patent
Hisatsugu et al.

(10) Patent No.: US 10,901,208 B2
(45) Date of Patent: Jan. 26, 2021

(54) HEAD-UP DISPLAY APPARATUS

(71) Applicant: DENSO CORPORATION, Kariya (JP)

(72) Inventors: Shinsuke Hisatsugu, Kariya (JP); Makoto Inomata, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 16/077,099

(22) PCT Filed: Jan. 13, 2017

(86) PCT No.: PCT/JP2017/000940
§ 371 (c)(1),
(2) Date: Aug. 10, 2018

(87) PCT Pub. No.: WO2017/141594
PCT Pub. Date: Aug. 24, 2017

(65) Prior Publication Data
US 2019/0041640 A1    Feb. 7, 2019

(30) Foreign Application Priority Data

Feb. 18, 2016 (JP) .................................. 2016-028521
Feb. 18, 2016 (JP) .................................. 2016-028522

(51) Int. Cl.
*G06F 1/16* (2006.01)
*G02B 27/01* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ................ G02B 27/0101; G02B 27/01; G02B 27/0149; G02B 2027/0154;
(Continued)

(56) References Cited

U.S. PATENT DOCUMENTS 7,659,868 B2 * 2/2010 Kumon .............. G02B 27/0149
                                                              345/7
8,077,396 B2 * 12/2011 Croy ...................... B60K 35/00
                                                              359/632
(Continued)

FOREIGN PATENT DOCUMENTS

JP      H11091403 A      4/1999
JP      2002331854 A     11/2002
(Continued)

*Primary Examiner* — Abhishek M Rathod
*Assistant Examiner* — Keith DePew
(74) *Attorney, Agent, or Firm* — Harness, Dickey & Pierce, P.L.C.

(57) ABSTRACT

A display unit projects a display image on a display member outside an apparatus housing from an inside of the apparatus housing through an opening of the apparatus housing. A cover is configured to form a through hole by bending at a second side opposite to a first side. A movable mechanism moves the cover between a closed position, at which an opening of the apparatus housing is closed, and an opened position, at which the opening is opened. When the cover is in the closed position, a bending unit holds the cover in a state where the through hole is not formed. When the cover moves from the closed position to the opened position, the bending unit bends the cover to change the cover from a state in which the through hole is not formed to a state in which the through hole is formed.

24 Claims, 12 Drawing Sheets

(51) Int. Cl.
  *B60K 35/00* (2006.01)
  *B60R 1/00* (2006.01)
(52) U.S. Cl.
  CPC ......... *G02B 27/01* (2013.01); *G02B 27/0149* (2013.01); *G06F 1/16* (2013.01); *B60K 2370/1529* (2019.05); *B60K 2370/334* (2019.05); *B60K 2370/693* (2019.05); *B60R 2300/205* (2013.01); *G02B 2027/0154* (2013.01)
(58) Field of Classification Search
  CPC .. G02B 2027/0159; B60K 35/00; B60R 1/00; G06F 1/16; G06F 1/1601; G06F 1/1675
  See application file for complete search history.

(56) References Cited

U.S. PATENT DOCUMENTS

| | | | | |
|---|---|---|---|---|
| 9,995,995 | B2* | 6/2018 | Chen | G03B 21/10 |
| 10,310,262 | B2* | 6/2019 | Ogasawara | B60K 35/00 |
| 10,310,263 | B2* | 6/2019 | Nakayama | G02B 27/0149 |
| 10,416,449 | B2* | 9/2019 | Saitou | G02B 27/01 |
| 2002/0166273 | A1* | 11/2002 | Nakamura | G02B 27/0101 40/593 |
| 2002/0167189 | A1 | 11/2002 | Nakamura et al. | |
| 2005/0024490 | A1* | 2/2005 | Harada | G02B 27/0149 348/115 |
| 2005/0259034 | A1* | 11/2005 | Harada | G02B 27/0101 345/7 |
| 2008/0285138 | A1* | 11/2008 | Lebreton | B60K 35/00 359/630 |
| 2010/0046082 | A1* | 2/2010 | Croy | B60K 35/00 359/632 |
| 2013/0100533 | A1* | 4/2013 | Potakowskyj | G02B 27/0149 359/630 |
| 2013/0194518 | A1* | 8/2013 | Moussa | G02B 7/1821 349/11 |
| 2014/0225811 | A1* | 8/2014 | Killguss | G02B 7/1827 345/7 |
| 2014/0340851 | A1* | 11/2014 | Yomogita | H05K 5/0017 361/725 |
| 2014/0368097 | A1* | 12/2014 | Yomogita | G02B 27/0149 312/23 |
| 2015/0070771 | A1* | 3/2015 | Jeon | G02B 27/0149 359/630 |
| 2015/0146299 | A1* | 5/2015 | Koseki | G02B 27/0101 359/632 |
| 2015/0362732 | A1* | 12/2015 | Ruyten | G02B 27/0149 359/632 |
| 2016/0147066 | A1* | 5/2016 | Ogasawara | G02B 27/0149 359/630 |
| 2016/0299343 | A1* | 10/2016 | Chien | G02B 27/0149 |
| 2017/0075123 | A1* | 3/2017 | Chien | G02B 27/0149 |
| 2017/0082857 | A1* | 3/2017 | Schoch | B60K 35/00 |
| 2017/0227769 | A1* | 8/2017 | Tatekawa | G02B 27/0149 |
| 2017/0299922 | A1* | 10/2017 | Matsuura | B60K 35/00 |
| 2017/0354046 | A1* | 12/2017 | Chien | B60K 35/00 |
| 2018/0031833 | A1* | 2/2018 | Ogasawara | B60K 35/00 |
| 2018/0037115 | A1* | 2/2018 | Chonan | B60K 35/00 |
| 2018/0129125 | A1* | 5/2018 | Chen | G03B 21/10 |
| 2018/0149868 | A1* | 5/2018 | Nakayama | B60K 37/04 |
| 2018/0180142 | A1* | 6/2018 | Watanabe | B60K 35/00 |
| 2018/0201204 | A1* | 7/2018 | Saitou | B60K 35/00 |
| 2018/0373031 | A1* | 12/2018 | Nakayama | B60K 35/00 |
| 2018/0373034 | A1* | 12/2018 | Saitou | B60K 37/04 |
| 2019/0072765 | A1* | 3/2019 | Ishikawa | B60K 35/00 |
| 2019/0079289 | A1* | 3/2019 | Saitou | B60K 35/00 |

FOREIGN PATENT DOCUMENTS

| | | |
|---|---|---|
| JP | 2002331855 A | 11/2002 |
| JP | 5020252 B2 | 9/2012 |
| JP | 2012254707 A | 12/2012 |
| JP | 2014015070 A | 1/2014 |

* cited by examiner

HEAD-UP DISPLAY APPARATUS

CROSS REFERENCE TO RELATED APPLICATIONS

This application is a U.S. National Phase Application under 35 U.S.C. 371 of International Application No. PCT/JP2017/000940 filed on Jan. 13, 2017 and published in Japanese as WO/2017/141594 A1 on Aug. 24, 2017. This application is based on and claims the benefit of priority from Japanese Patent Applications No. 2016-028521 filed on Feb. 18, 2016 and No. 2016-028522 filed on Feb. 18, 2016. The entire disclosures of all of the above applications are incorporated herein by reference.

TECHNICAL FIELD

The present disclosure relates to a head-up display apparatus.

BACKGROUND ART

Recent vehicles are equipped with a head-up display apparatus that projects (projects) an image from a display unit to a combiner. In the head-up display apparatus of the above type, when projecting the image from the display unit to the combiner, a predetermined distance (that is, an optical path length) is secured between the display apparatus and the combiner in order to obtain the image having a predetermined display build on a combiner display surface.

In addition, the combiner is deployed to an outside of an apparatus housing in use, but the combiner is accommodated in the apparatus housing when not in use. Specifically, the apparatus housing, in which the combiner is accommodated and when not in use, is covered with a cover so as to close both of a doorway of the combiner and an optical path through which the image passes. At the time of use, the cover moves to expose the closed doorway of the combiner, the combiner can move to a predetermined display position outside the apparatus housing, and the closed optical path through which the image passes is also secured.

PRIOR TECHNICAL LITERATURE

Patent Literature

PATENT LITERATURE 1: JP 5020252 B2

SUMMARY OF INVENTION

In recent years, there is a tendency for a larger number of devices such as a meter display device to be arranged inside an instrument panel of a vehicle in which the head-up display apparatus of the above type is placed. For that reason, a build of the head-up display apparatus has been required to be reduced more.

Some conventional head-up display apparatuses employ a configuration in which an image light is directly applied to the combiner. With the configuration, the build of the apparatus becomes long along the optical path through which the image passes, which makes it difficult to reduce the build of the apparatus. On the other hand, some head-up display apparatuses with an improved build length employ a configuration in which a reflecting mirror is placed in the optical path through which the image passes so as to fold back the optical path through which the image passes. This configuration makes it difficult to secure a movable area of the cover that functions as a lid of the apparatus housing this time. Even if both of the optical path through which the image passes and the movable area of the cover can be secured, a dead space increases in the apparatus housing, as a result of which the build of the apparatus cannot be greatly reduced.

Further, in the head-up display apparatus, normally, a driving source is provided for each of the cover and the combiner, and a control unit controls driving of those driving sources. In the driving control, there is a need to move the cover and the combiner so as not to interfere with each other. Specifically, a time difference control and a movable mechanism are required in which the cover that closes the doorway of the combiner is first moved in a state where the combiner is accommodated in the apparatus housing, the doorway of the combiner is secured, and thereafter the combiner is moved outside the apparatus housing. This causes a problem that the control and the mechanism become complicated and increased in size.

In addition, an increase in the size of the mechanism also causes another problem that the apparatus housing accommodating the mechanism increases in size and a load on the driving sources increases.

It is an object of the present disclosure to provide a head-up display apparatus capable of reducing a build of the apparatus as compared with conventional head-up display apparatus. It is another object of the present disclosure to provide a head-up display apparatus in which a mechanism for moving both of a cover and a combiner of an apparatus housing is realized by a simpler mechanism than that in the prior art.

According to one aspect of the present disclosure, a head-up display apparatus comprises a display unit configured to project a display image on a display member, which is located outside an apparatus housing, from an inside of the apparatus housing through an opening of the apparatus housing. The head-up display apparatus further comprises a cover configured to bend at a second side, which is opposite to a first side, to form a through hole. The head-up display apparatus further comprises a movable mechanism configured to move the cover between a closed position, in which an opening of the apparatus housing is closed, and an opened position, in which the opening is opened. The head-up display apparatus further comprises a bending unit. When the cover is in the closed position, the bending unit is configured to hold the cover in a state, in which the through hole is not formed. When the cover moves from the closed position to the opened position, the bending unit is configured to bend the cover to change the cover from the state, in which the through hole is not formed, to a state, in which the through hole is formed. When the cover is in the opened position, the bending unit is configured to hold the cover in the state where the through hole is formed. When the cover moves from the opened position to the closed position, the bending unit is configured to eliminate or to alleviate the bend of the cover to change the cover from the state, in which the through hole is formed, to the state, in which the through hole is not formed.

According to one aspect of the present disclosure, a head-up display apparatus, comprises a combiner movable between an accommodated position, at which the combiner is accommodated in an apparatus housing, and a display position, at which the combiner is outside the apparatus housing and visible to a user. The head-up display apparatus further comprises a display unit configured to project light from an inside of the apparatus housing through a housing opening to form a display image on the combiner, which is at the display position. The head-up display apparatus further comprises a cover movable between a closed position, in which a doorway of the combiner in the apparatus housing and the housing opening are closed, and an opened position, in which the doorway and the housing opening are opened. The head-up display apparatus further comprises a rotational body. The head-up display apparatus further comprises a drive unit. The rotational body is rotational about a predetermined rotation axis line. The combiner and the cover are rotationally coupled to the rotational body at different positions around the rotation axis line. The rotational body is swingable about the rotation axis line between a predetermined first angular position and a predetermined second angular position. At the predetermined first angular position, the combiner is located at the display position, and the cover is located at the opened position. At the predetermined second angular position, the combiner is located at the accommodated position, and the cover is located in the closed position. The drive unit is configured to swing the rotational body between the first angular position and the second angular position.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
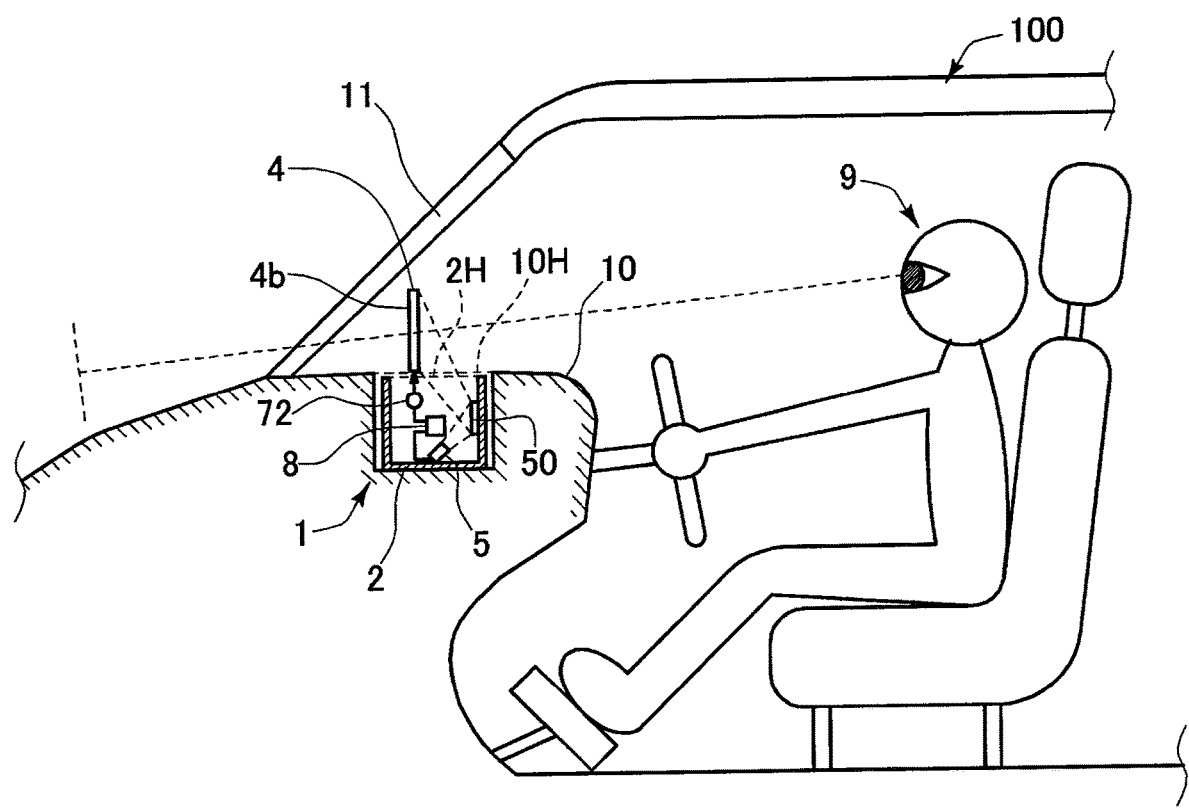
FIG. 1 is a diagram schematically showing a configuration of a head-up display apparatus and a placement of the head-up display apparatus in a vehicle interior.

A head-up display apparatus 1 of FIG. 1 is an example of a vehicle display apparatus mounted on a vehicle 100. The head-up display apparatus 1 is placed, for example, in a space where a driver 9 seats in a vehicle interior, that is, in an instrument panel unit 10 located in front of a driver's seat space.

Figure 2A:
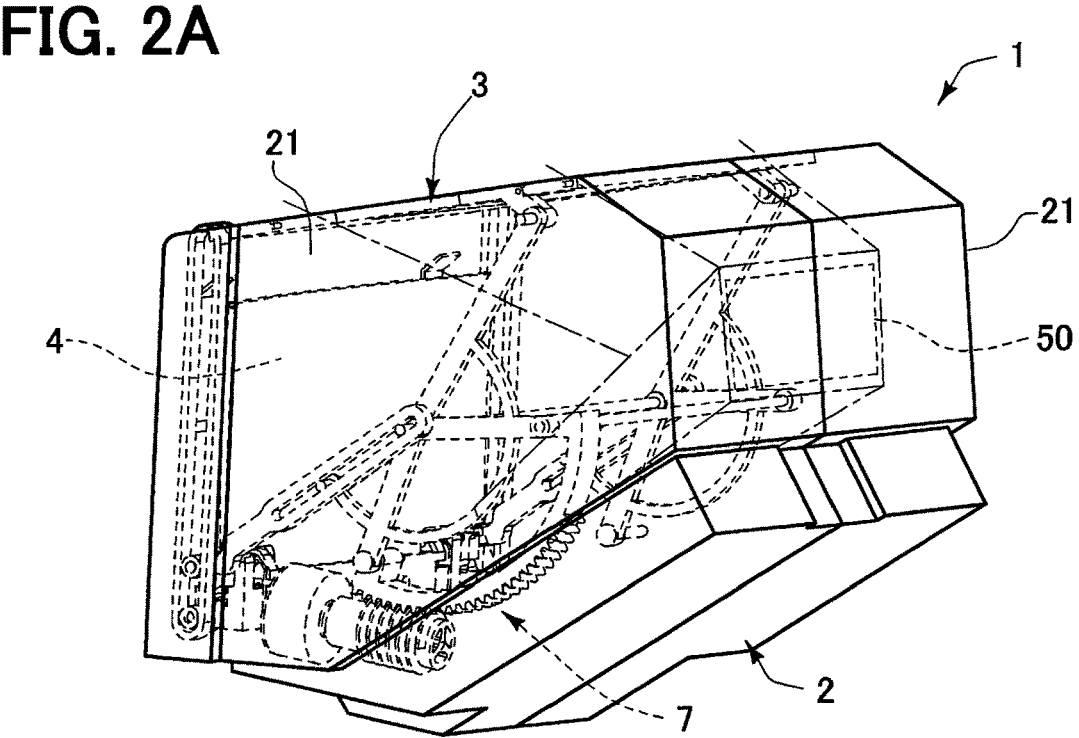
FIG. 2A is a perspective view showing an appearance of the head-up display apparatus of FIG. 1 in a state where a cover is closed.
Figure 2B:
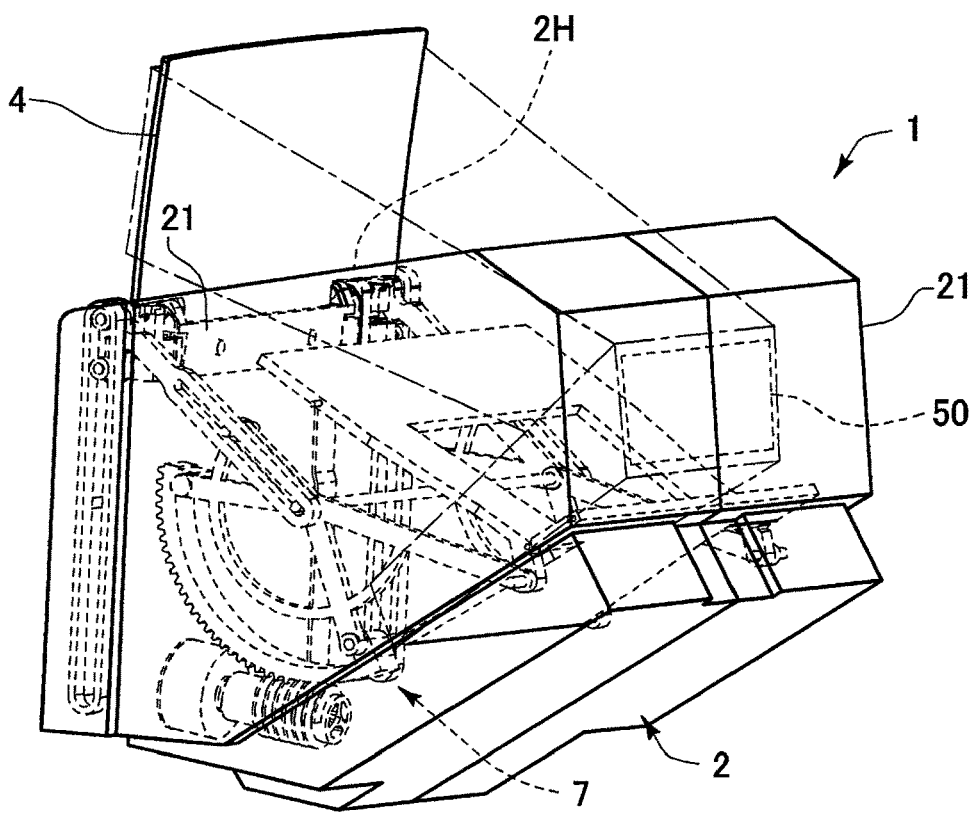
FIG. 2B is a perspective view showing an appearance of the head-up display apparatus of FIG. 1 in a state where the cover is opened.
Figure 3A:
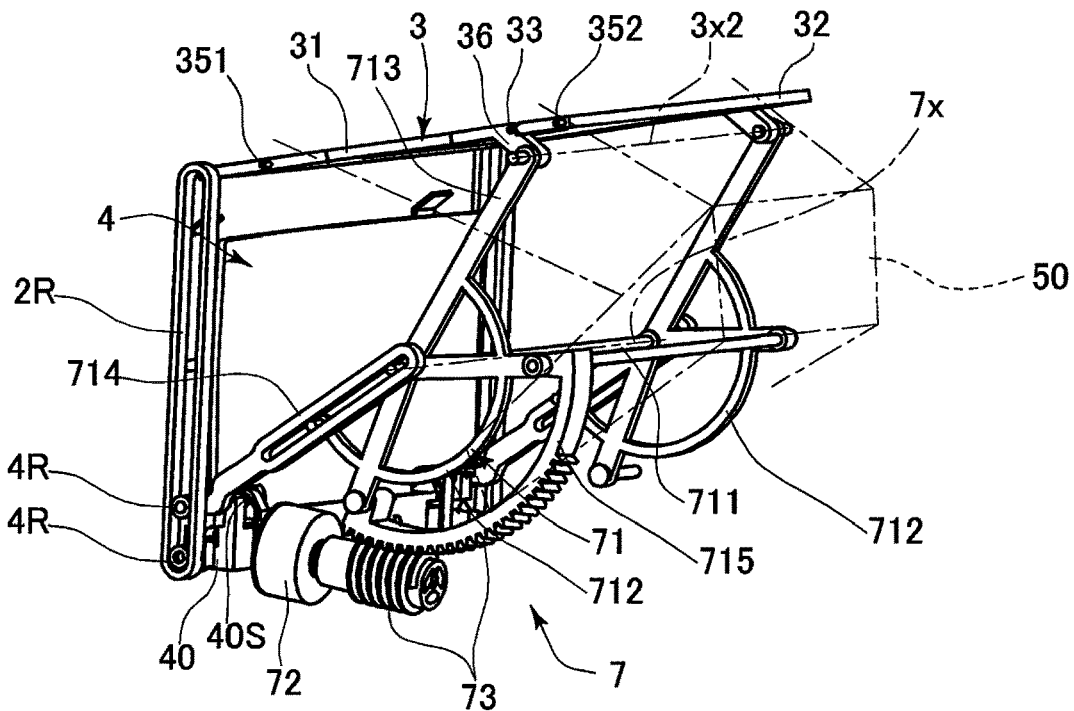
FIG. 3A is a perspective view showing an internal structure of the head-up display apparatus of FIG. 1 in the state where the cover is closed.
Figure 3B:
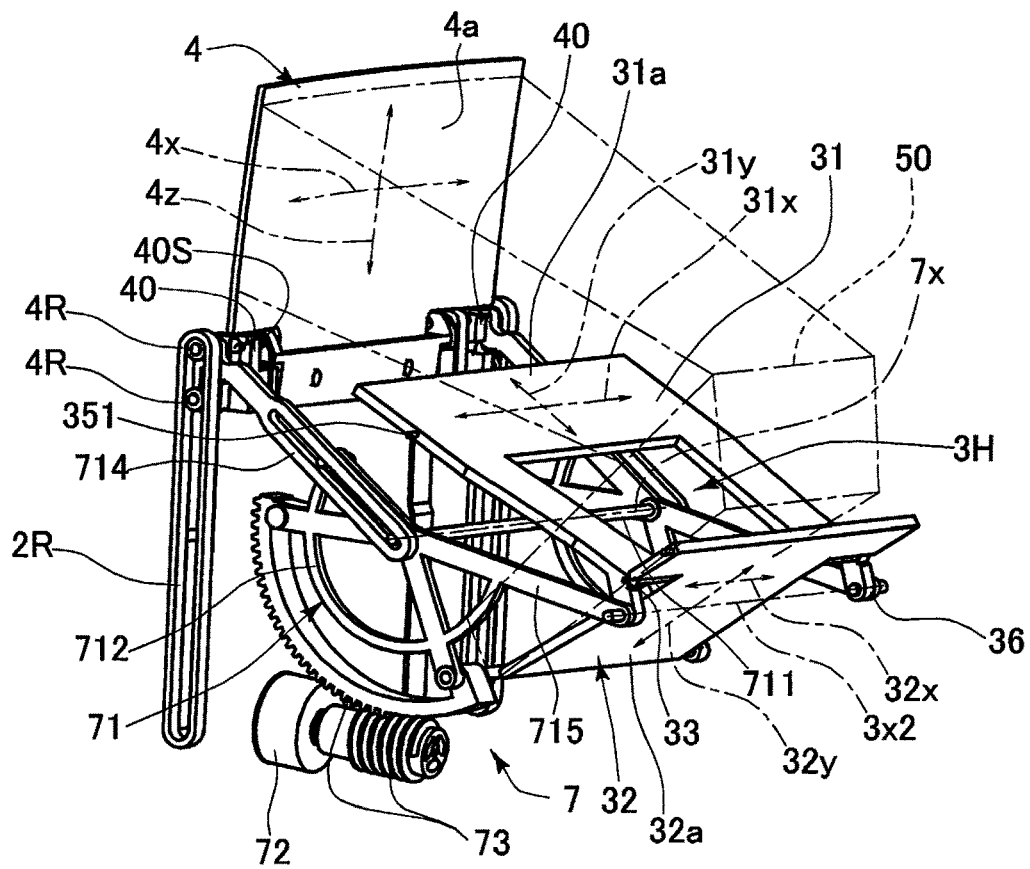
FIG. 3B is a perspective view showing the internal structure of the head-up display apparatus of FIG. 1 in the state where the cover is opened.
Figure 4A:
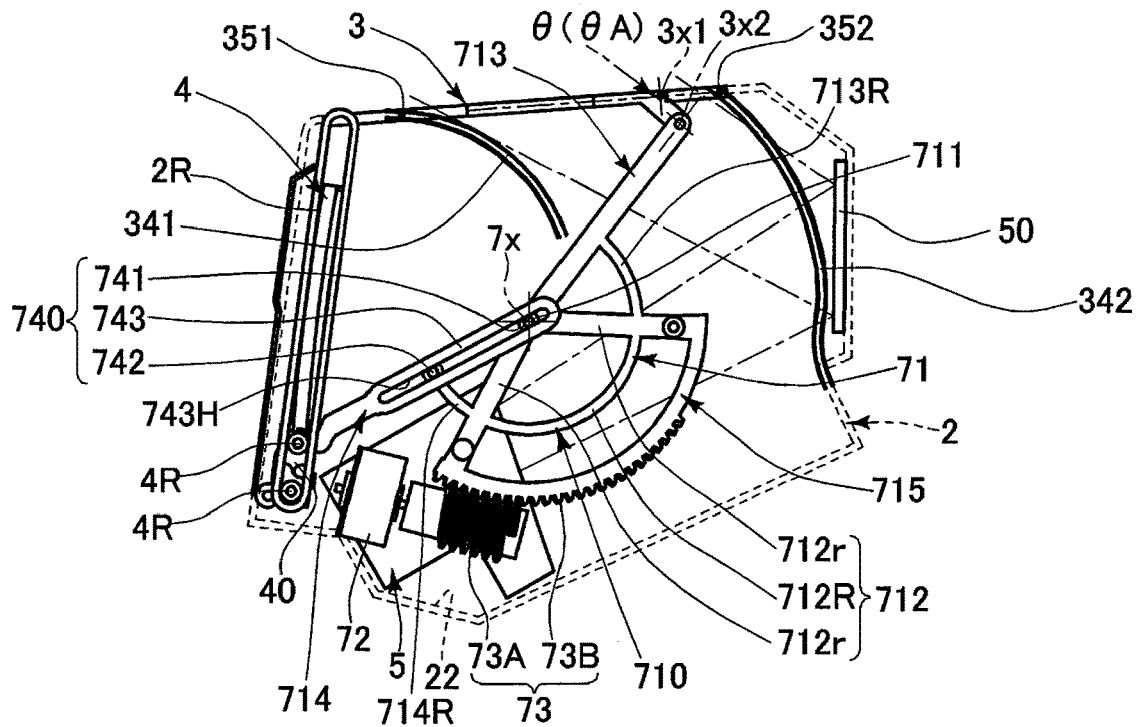
FIG. 4A is a side view showing the internal structure of the head-up display apparatus of FIG. 1 in the state where the cover is closed.
Figure 4B:
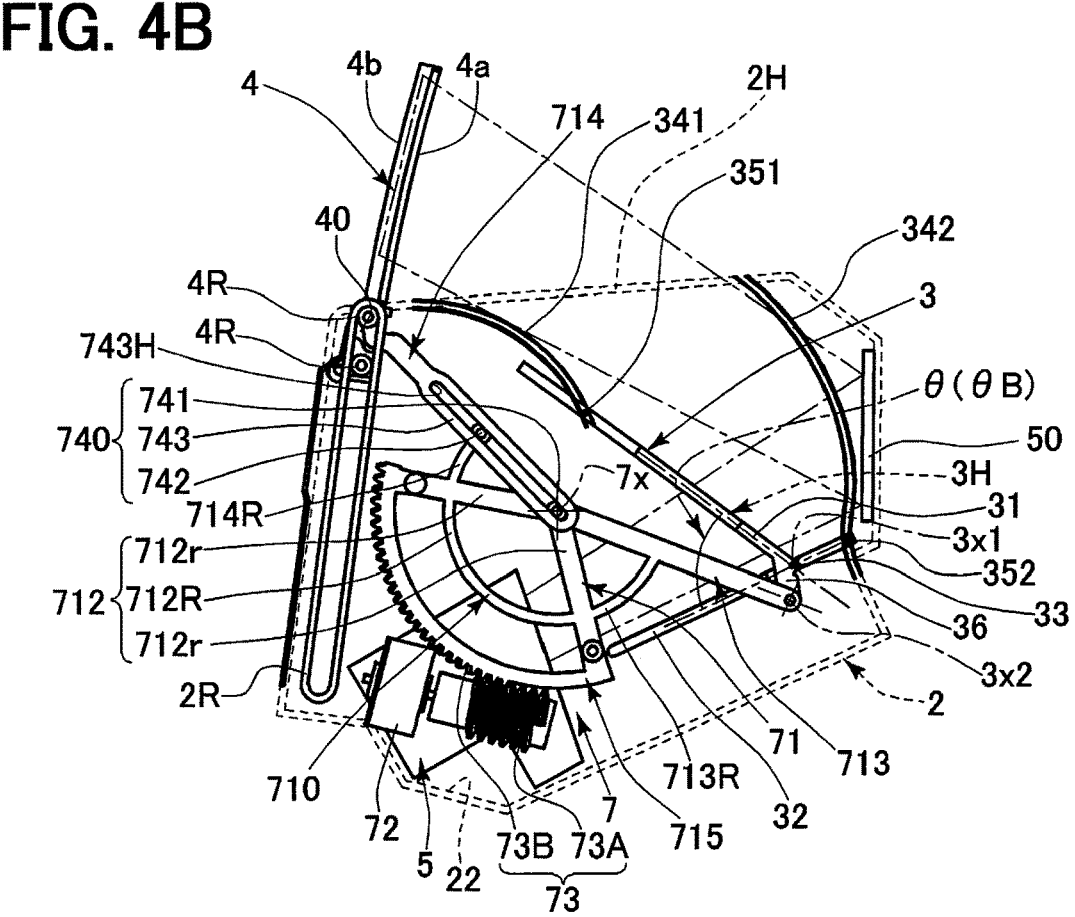
FIG. 4B is a side view showing the internal structure of the head-up display apparatus of FIG. 1 in the state where the cover is opened.

The head-up display apparatus 1 includes an apparatus housing 2 (refer to FIGS. 2A and 2B) incorporated in the instrument panel unit 10. As shown in FIGS. 3A and 3B, a combiner 4, a display unit 5 (refer to FIG. 1), a movable mechanism 7 including a rotational body 71, and a control unit 8 (refer to FIG. 1) are located inside the apparatus housing 2. As shown in FIGS. 2B and 4B, an opening 2H (hereinafter also referred to as a housing opening 2H) is formed in an upper surface of the apparatus housing 2, and a cover 3 is located so as to close the opening 2H (refer to FIGS. 2A, 3A, and 4A). An opening 10H (refer to FIG. 1) is also formed in an upper surface of the instrument panel portion 10, and the apparatus housing 2 is located inside the instrument panel unit 10 such that the opening 2H of the apparatus housing 2 is located at a position of the opening 10H.

The cover 3 is movable between a closed position, at which the doorway 24H (refer to FIGS. 5B and 6) of the combiner 4 in the apparatus housing 2 and the housing opening 2H are closed, and an opened position, at which the doorway 24H and the housing opening 2H are opened. In addition, when the cover 3 is located at the opened position by the above movement, the cover 3 is in an accommodation state in which the cover 3 is accommodated inside the apparatus housing 2. The cover 3 in the accommodation state is bent to provide the through hole 3H by bending the second side opposite to the first side relative to the first side. The through hole 3H functions as a passage hole for light forming a display image emitted from the display unit 5. The light emitted from the display unit 5 passes through the through hole 3H and further passes through the housing opening 2H and is projected onto the combiner 4 outside the apparatus housing 2.

Figure 7A:
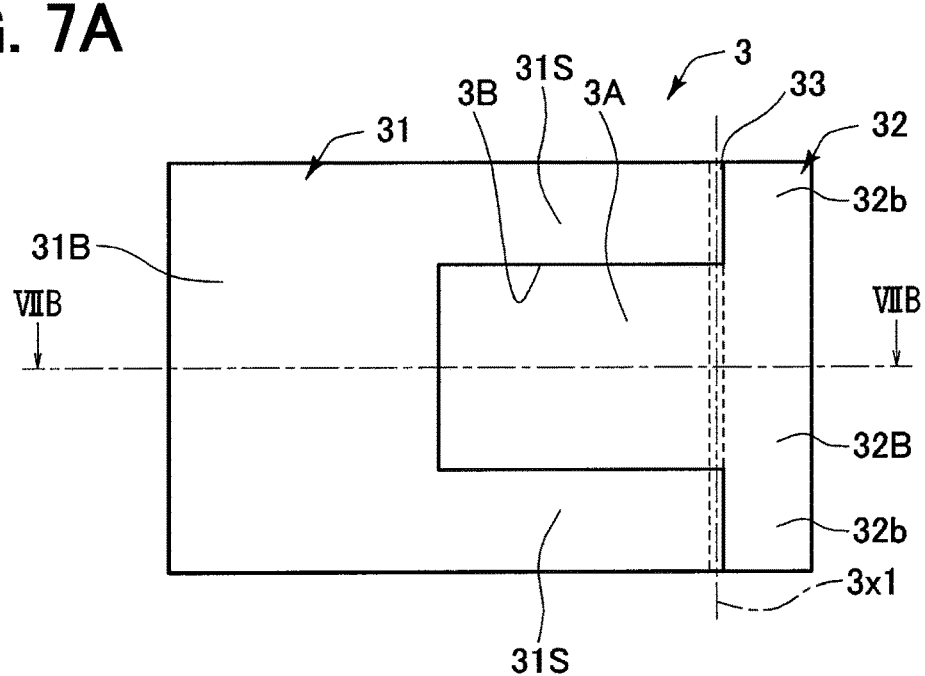
FIG. 7A is a diagram schematically showing the cover that is closed in the head-up display apparatus of FIG. 1.
Figure 7B:
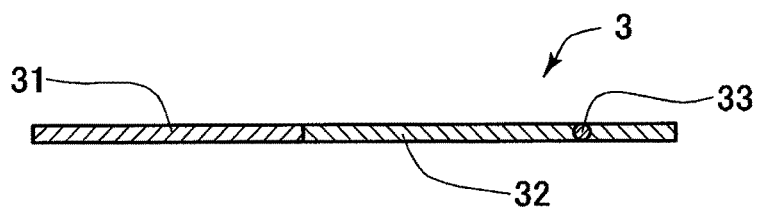
FIG. 7B is a cross-sectional view taken along a line VIIB-VIIB in FIG. 7A.
Figure 7C:
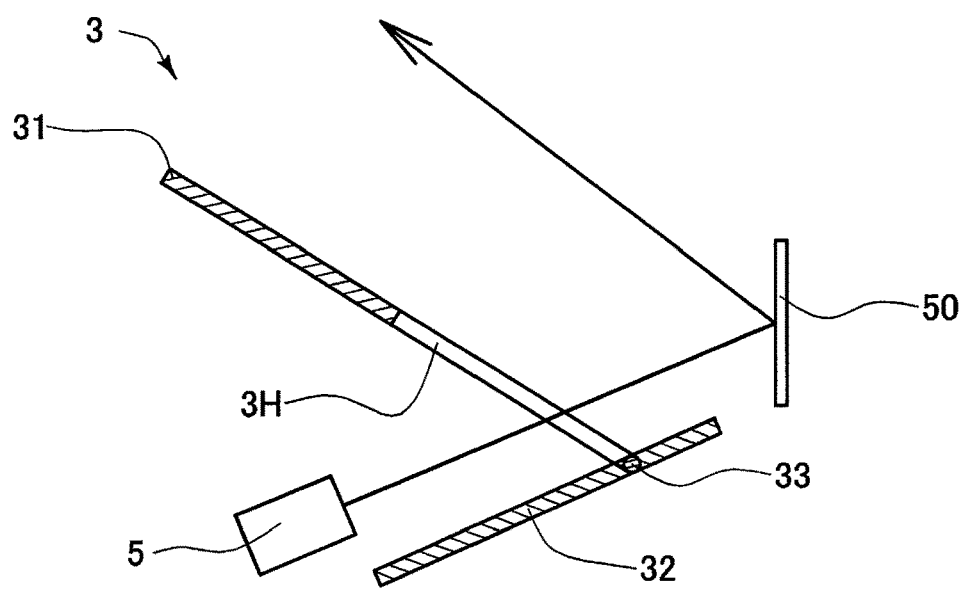
FIG. 7C is a diagram showing the cover of FIG. 7B which is in an opened state.

As shown in FIGS. 7A and 7B, in this example, the cover 3 includes a first cover portion 31 on the first side, a second cover portion 32 on the second side opposite to the first cover portion 31, and a coupling portion 33 that couples the first cover portion 31 to the second cover portion 32 so as to be rotational about a predetermined rotation axis line 3x1. In other words, as shown in FIG. 7C, the cover 3 can be bent such that the first cover portion 31 side and the second cover portion 32 side are bent from the coupling portion 33 as a starting point. As shown in FIGS. 2B and 3B, the cover 3 at the opened position is bent and accommodated inside the apparatus housing 2. On the other hand, as shown in FIG. 7B, the first cover portion 31 and the second cover portion 32 each have a plate shape, and the cover 3 can be brought into a plane in which the first cover portion 31 and the second cover portion 32 are aligned in a plane. As shown in FIGS. 2A and 3A, the cover 3 at the closed position is brought in a plane and placed in the housing opening 2H, and closes the housing opening 2H into the closed state.

When an angle θ between the first cover portion 31 and the second cover portion 32 about the rotation axis line 3x1 is a predetermined opened angle θB (refer to FIG. 4B), the angular difference causes the through hole 3H to be formed (in other words, a state in which the through hole 3H is formed: refer to FIG. 3B). On the other hand, when the angle θ between the first cover portion 31 and the second cover portion 32 is a predetermined closed angle θA (refer to FIG. 4A), the through hole 3H is closed (in other words, a state in which the through hole 3H is not formed: refer to FIG. 3A). In this example, the through hole 3H is closed when the closed angle θA is 0 degrees. The through hole 3H is formed in a bent state where the angle θ is larger than the angle θA. The bending angle θ between the first cover portion 31 and the second cover portion 32 in this example is the minimum at the closed angle θA of FIG. 4A, and is the maximum at the opened angle θB of FIG. 4B.

Figure 5A:
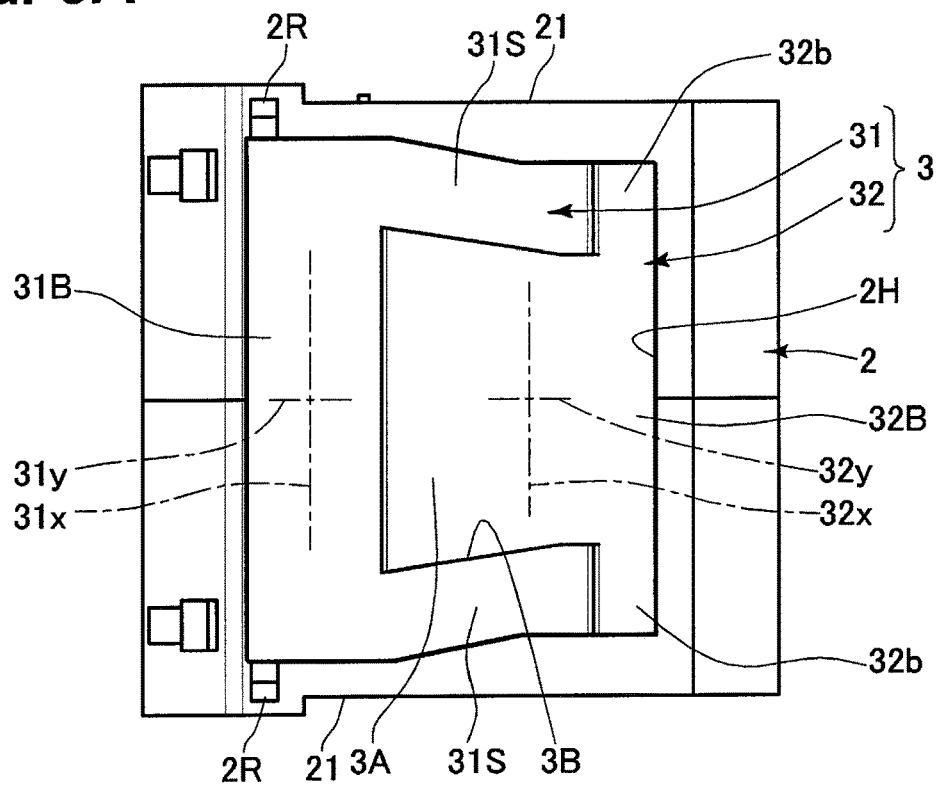
FIG. 5A is a top view showing the head-up display apparatus of FIG. 1 in the state where the cover is closed.

In a state where the first cover portion 31 and the second cover portion 32 form the closed angle θA, as shown in FIG. 5A, one of the first cover portion 31 and the second cover portion 32 has a recess portion 3B, and the other has a protrusion portion 3A as a closing portion that enters and closes the inside of the recess portion 3B. A recessed space defining the recess portion 3B is a portion forming the through hole 3H. A state in which the recess portion 3A closes the recessed space of the recess portion 3B represents an angular state in which the through hole 3H is closed (refer to FIGS. 4A and 5A), and a state in which the protrusion portion 3A is not located in the recessed space of the recess portion 3B represents an angular state (refer to FIGS. 4B and 5B) in which the through hole 3H is opened. In this example, the first cover portion 31 has the recess portion 3B and the second cover portion 32 has the protrusion portion 3A.

The cover 3 is moved by the movable mechanism 7 between a closed position (refer to FIGS. 4A and 5A) at which the housing opening 2H of the apparatus housing 2 is closed and an opened position (refer to FIGS. 4B and 5B) in which the housing opening 2H is opened. Along with the above movement, the cover 3 generates the bending operation described above (that is, a change in the angle θ described above). The bending operation is carried out while the cover 3 is guided by cam grooves 341 and 342 forming a cover guide portion shown in FIGS. 4A and 4B.

The cam grooves 341 and 342 are formed corresponding to both of the first cover portion 31 and the second cover portion 32. In this example, the cam grooves 341 and 342 are formed in the same shape on both of inner wall surfaces of side surface portions 21 (in this example, side surface portions on right and left sides of the vehicle: refer to FIGS. 2A and 2B) facing each other in the apparatus housing 2. In the figure, only the cam grooves 341 and 342 of one side surface portion 21 are illustrated while the cam grooves 341 and 342 of the other side surface portion 21 on the opposite side is omitted from illustration. As shown in FIGS. 4A and 4B, the other first cover portion 31 and the other second cover portion 32 are provided with cam pins 351 and 352 as guide receiving portions guided from the respective cam grooves 341 and 342. The cam pins 351 and 352 move along a groove extending direction in the cam grooves 341 and 342.

Incidentally, the cam grooves 341 and 342 forming the guide portions may be configured using another guide system or another guide shape as long as the guide system or the guide shape guides the first cover portion 31 and the second cover portion 32 so as to cause a predetermined angle change between the first cover portion 31 and the second cover portion 32 in association with the positional movement of the cover 3.

In that manner, the cover 3 changes the angle θ formed by the first cover portion 31 and the second cover portion 32 in conjunction with the opening and closing movement by the movable mechanism 7. In other words, when the cover 3 moves from the closed position to the opened position by the movable mechanism 7, the cam grooves 341 and 342 rotate the first cover portion 31 and the second cover portion 32 relatively around the rotation axis line 3x1 to change the angle θ formed between the first cover portion 31 and the second cover portion 32 from the closed angle θA to the opened angle θB. In this situation, the protrusion portion 3A and the recess portion 3B are displaced in the rotation direction of the first cover portion 31 and the second cover portion 32 to cause the angular difference θB. As a result, the entire cover 3 becomes in a bent state, and the through hole 3H penetrating in a direction opposite to a convex direction of the protrusion portion 3A is provided inside the recess portion 3B.

On the other hand, when the cover 3 moves from the opened position to the closed position by the movable mechanism 7, the cam grooves 341 and 342 rotate the first cover portion 31 and the second cover portion 32 relatively around the rotation axis line 3x1 to change the angle θ formed between the first cover portion 31 and the second cover portion 32 from the opened angle θB to the closed angle θA. At this time, the angular difference between the recess portion 3B and the protrusion portion 3A is eliminated between the first cover portion 31 and the second cover portion 32. As a result, the entire cover 3 is in a plane, and the through hole 3H formed inside the recess portion 3B is closed by the protrusion portion 3A.

Figure 6:
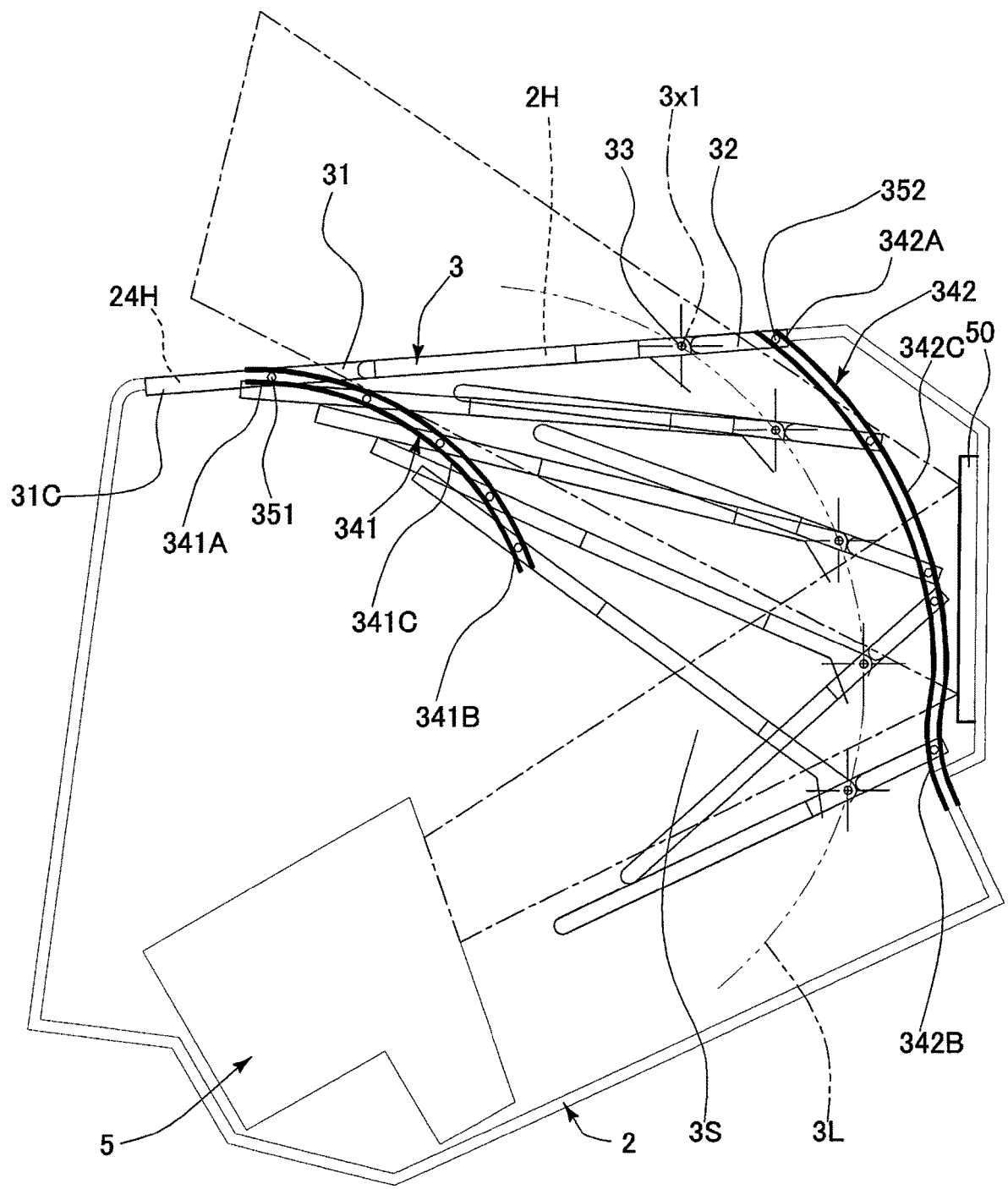
FIG. 6 is a diagram showing movement of the cover in the head-up display apparatus of FIG. 1.

Incidentally, the cam grooves 341 and 342 function as an angular transformation unit for causing the cover 3 to change the angle. Further, the cam grooves 341 and 342 also function as a closed angle holding portion that holds the first cover portion 31 and the second cover portion 32 at the closed angle θA when the cover 3 is located at the closed position, and also functions as an open angle holding portion that holds the first cover portion 31 and the second cover portion 32 at the opened angle θB when the cover 3 is located at the opened position. In this example, as shown in FIG. 6, first side end portions (in this example, upper ends) 341A and 342A of the cam grooves 341 and 342 function as the closed angle holding portion and second side end portions (in this example, lower ends) 341B and 342B opposite to the first side end portions function as an open angle holding portion. Sections 341C and 342C between the first side end portions 341A, 342A and the second side end portions 341B, 342B of the cam grooves 341 and 342 function as an angular transformation unit. The angular transformation unit, the closed angle holding portion, and the open angle holding portion function as a bending unit for causing the cover 3 to be bent.

The movable mechanism 7 includes a cover moving mechanism that moves the cover 3 between the closed position and the opened position as described above as well as a combiner moving mechanism that moves the combiner 4 between an accommodated position (refer to FIGS. 3A and 4A) at which the combiner 4 is accommodated in the apparatus housing 2 and a display position (refer to FIGS. 3B and 4B) at which the combiner is outside the apparatus housing 2 and visible to a user, in conjunction with the movement of the cover 3. With the movement of the cover 3, the combiner 4 is guided by a guide rail portion 2R serving as a combiner guide portion so as to move between the accommodated position and the display position in a predetermined posture. In other words, the combiner 4 is guided by the guide rail portion 2R so as to move back and forth along a predetermined combiner movement route between the first side and the second side in a movable direction of the combiner 4.

The combiner 4 is a display member (also referred to as a projection member) onto which a display image is projected from the display unit 5. As shown in FIG. 1, in this example, the combiner 4 is located on a side of a driver 9 from a front window 11 of the vehicle. The combiner 4 is made of a transparent material such as acrylic resin, for example. The combiner 4 is, for example, a plate-shape member having a quadrangular shape when viewed from a front. The combiner 4 functions like a half mirror that reflects the display image from the display unit 5 and transmits the light from a back surface 4b side.

The combiner 4 is provided with rolling bodies (in this case, rollers) 4R at lower end portions 40 of both ends of a display surface (also referred to as a projection surface) 4a in a surface width direction 4x (in this example, a lateral direction of the vehicle: refer to FIG. 3B). The rolling bodies 4R rotate on a guide rail portion 2R provided on a vehicle front side of the apparatus housing 2. With the rotation of the rolling bodies 4R, the combiner 4 entirely moves up and down along the guide rail 2R.

It should be noted that the guide rail portion 2R forming the guide portion may be configured by another guide system and another guide shape as long as the combiner 4 is guided so as to be movable in a predetermined posture along a predetermined movement locus. For example, the guide rail portion 2R may be configured by a sliding guide, and a sliding guide portion as a guide receiving portion provided on the combiner 4 in place of the rolling bodies 4R may be slid along the sliding guide.

The guide rail portion 2R linearly extends in a vehicle vertical direction 4z. A state in which the rolling bodies 4R are located at a lower end of the guide rail portion 2R represents the accommodated position of the combiner 4 and a state in which the rolling bodies 4R are located at an upper end of the guide rail portion 2R represents the display position of the combiner 4. At the display position, the combiner 4 is in a protruding state where the combiner 4 protrudes upward from the housing opening 2H of the apparatus housing 2 so that the combiner 4 becomes visible by the driver 9 (refer to FIG. 1). On the other hand, at the accommodated position, the combiner 4 is accommodated at a position lower than the housing opening 2H of the apparatus housing 2 so that the display surface 4a cannot be visually recognized by the driver 9. The combiner 4 passage region in the upper surface opening 2H of the apparatus housing 2 is the doorway 24H (refer to FIG. 6) of the combiner 4 in the apparatus housing 2.

The display unit 5 generates a display image to be presented to the driver 9, and projects the light serving as the display image onto the combiner 4, as shown in FIGS. 4A and 4B. In FIGS. 4A and 4B, the alternate long and short dashed line extending from the display unit 5 indicates a passage path of the light. The display unit 5 is a well-known display device (also referred to as a projection unit) having a light source unit, a display panel (for example, a liquid crystal panel), and the like. The display unit 5 is located on a bottom surface 22 of the apparatus housing 2 and is located on a vehicle front side in the apparatus housing 2 and on a vehicle rear side of the combiner 4 which is located at the accommodated position.

As shown in FIG. 4B, the light serving as a display image emitted from the display unit 5 passes above the second cover portion 32 of the cover 3 which is located at the opened position, from an end side of the second cover portion 32 opposite to the cam pin 352 side toward the coupling portion 33 side, and passes through the through hole 3H (refer to FIG. 3B) ahead of the coupling portion 33 side. The light serving as the display image in this situation passes above the second cover portion 32 along the second cover portion 32 (in this case, parallel to the plate-shape second cover portion 32). Since the second cover portion 32 moves from the upper side to the lower side when the cover 3 moves from the closed position to the opened position, the upper side of the second cover portion 32 represents a passage region through which the second cover portion 32 passes. In other words, the light emitted from the display unit 5 is directed to the through hole 3H so as to pass through the passage region (also referred to as a movable range) of the second cover portion 32.

A reflecting mirror 50 (in this case, a concave mirror forming a magnifying glass) is located inside the apparatus housing 2 ahead of the light to form the display image passing through the through hole 3H. The light having passed through the through hole 3H is reflected by the reflecting mirror 50 and passes above the first cover portion 31 from a coupling portion 33 side of the first cover portion 31 toward an end side opposite to the coupling portion 33 side, and thereafter passes through the inside of the housing opening 2H of the apparatus housing 2 and the inside of the upper surface opening 10H (refer to FIG. 1) of the instrument panel portion 10. The light having passed through the openings 2H and 10H enters a vehicle interior as shown in FIG. 1 and is projected onto the combiner 4 located at the display position. In other words, the display unit 5 functions as a display unit (also referred to as a projection unit) that projects the display image onto the combiner 4 located at the display position after passing through the housing opening 2H of the apparatus housing 2 from the inside of the apparatus housing 2 together with the reflecting mirror 50.

The control unit 8 is formed of a well-known CPU, ROM, RAM and the like. The control unit 8 is an operation control unit that controls the movement of the combiner 4 and the cover 3 while controlling the movable mechanism 7 (more specifically, a motor 72). In addition, the control unit 8 also functions as a display control unit that causes the combiner 4 to perform a display according to a scene while controlling the display unit 5.

Hereinafter, the movable mechanism 7 will be described in detail.

As shown in FIGS. 4A and 4B, the movable mechanism 7 includes a rotational body 71 that is provided so as to be rotational about a predetermined rotation axis line 7x, the motor 72 as a driving source, and a gear portion 73 as a rotating force transmission unit that transmits a rotating output of the motor 72 to the rotational body 71.

The rotational body 71 couples the combiner 4 and the cover 3 to each other at different positions around the rotation axis line 7x. Specifically, the combiner 4 is located on a first side in a radial direction (in this case, a front side of the vehicle) orthogonal to the rotation axis line 7x, and the cover 3 is located on a second side (in this case, a rear side of the vehicle) opposite to the first side in the radial direction, and the rotational body 71 is coupled to the combiner 4 on the first side in the radial direction and is coupled to the cover 3 on a second side in the radial direction.

The rotational body 71 is configured to be swingable like a seesaw between a predetermined first angular position (refer to FIG. 4A) and a predetermined second angular position (refer to FIG. 4B) around the rotation axis line 7x by means of the movable mechanism 7. With the swinging operation, the combiner 4 and the cover 3 operate as follows.

When the rotational body 71 is located at the first angular position, the combiner 4 is located at the accommodated position and the cover 3 is located at the closed position. In the case where the rotational body 71 located at the first angular position is subjected to a first-directional rotation towards the second angular position, the rotational body 71 moves the combiner 4 toward the first side (in this example, an upper side) in a predetermined movable direction so that the combiner 4 arrives at the display position from the accommodated position. In addition, the rotational body 71 moves the cover 3 toward the second side (in this example, a lower side) opposite to the first side in the movable direction so that the cover 3 arrives at the opened position from the closed position. In the case where the rotational body 71 is subjected to a second-directional rotation opposite to the first-directional rotation when the rotational body 71 is located at the second angular position, the rotational body 71 moves the combiner 4 toward the second side (in this example, the lower side) in the movable direction so that the combiner 4 arrives at the accommodated position from the display position. In addition, the rotational body 71 moves the cover 3 toward the first side (in this example, the upper side) in the movable direction so that the cover 3 arrives at the closed position from the opened position. It should be noted that the movable direction is a vertical direction of the vehicle.

Further, since the rotational body 71 is coupled to both of the combiner 4 and the cover 3, both of the movement from the accommodated position of the combiner 4 to the display position and the movement of the cover 3 from the closed position to the opened position are started at the same time when the first-directional rotation is started toward the second angular position at the first angular position. Likewise, both of the movement of the combiner 4 from the display position to the accommodated position and the movement of the cover 3 from the opened position to the closed position are started at the same time when the rotational body 71 starts the second-directional rotation opposite to the first-directional rotation at the second angular position. In other words, both of the combiner 4 and the cover 3 start to move at the same time of the moving the rotational body 71. As a result, the combiner 4 and the cover 3 move without interfering with each other. A complicated control or mechanism for timing the movements of the combiner 4 and the cover 3 is not required for the purpose of avoiding the interference.

Further, the rotational body 71 in this example includes a main body portion 710, a first coupling portion 713 that is coupled to the cover 3, a second coupling portion 714 that is coupled to the combiner 4, and an arcuate portion 715.

As shown in FIGS. 3A and 3B, the main body portion 710 includes a linear rotating shaft portion 711 that extends in a direction of the rotation axis line 7x and opposite frames 712 that are coupled to each other on both end sides of the rotating shaft portion 711 and located so as to face each other. As shown in FIGS. 4A and 4B, each of the opposite frames 712 includes an arcuate frame portion 712R and multiple coupling frame portions 712r that extend from each end of the rotating shaft portion 711 in the radial direction (that is, a direction orthogonal to the rotation axis line 7x), and connects to the arcuate frame portion 712R integrally. In this example, each of the opposite frames 712 is a fan-shaped frame in which the two coupling frame portions 712r extending outward in the radial direction with a predetermined angle around the rotation axis line 7x are coupled to the arcuate frame portion 712R that couples outer sides of those coupling frame portions 712r to each other in an arcuate shape.

The second cover portion 32 of the cover 3 pivots in such a manner as to descend in a space between the opposite frames 712 from above toward bottom to reach the opened position. On the other hand, the display section 5 is located below the rotating shaft portion 711. The light emitted from the display unit 5 passes through the through hole 3H in such a manner as to pass through the space between the opposite frames 712 on a lower side of the rotating shaft portion 711. In other words, the light emitted from the display unit 5 passes through the space through which the second cover portion 32 moves and then passes through the through hole 3H. With the use of the movable space of the second cover portion 32 as a path through which the light emitted from the display unit 5 passes, unnecessary space can be removed from the inside of the apparatus housing 2, and the apparatus housing 2 can be further reduced in size.

The first coupling portion 713 is integral with the main body portion 710 and rotates integrally with the main body portion 710. The first coupling portion 713 extends in the radial direction from each of both end portions of the main body portion 710 in the rotation axis line direction 7x of the rotational body 71. Further, the first coupling portion 713 is coupled to both end portions 36 of the cover 3 in the rotation axis line direction 3x1 on an extension front end side of the first coupling portion 713 so that the cover 3 is rotational about a rotation axis line 3x2 which has a positional relationship that is parallel to the rotation axis line 3x1. Further, the first coupling portion 713 has a reinforcing frame portion 713R that is integrally coupled to the opposite frame 712 at an intermediate position in an extending direction of the first coupling portion 713. In this example, the reinforcing frame portion 713R has a shape continuing from an arcuate frame portion 712R in an arcuate shape toward the first coupling portion 713 side from the arcuate frame portion 712R. The reinforcing frame portion 713R is integrated with the opposite frame 712 and the first coupling portion 713 on both ends.

Further, the first coupling portion 713 is coupled to the cover 3 at a position different from that of the coupling portion 33. The coupling portion 33 is a portion serving as a turning fulcrum portion of the bending operation of the cover 3. On the other hand, the first coupling portion 713 is a portion that transmits a rotating force of the rotational body 71 to the cover 3. Since the coupling portion 33 that couples the first cover portion 31 to the second cover portion 32 and the coupling portion 36 that couples the cover 3 to the first coupling portion 713 are located at different positions, and further the respective rotation axis lines 3x1 and 3x2 are parallel to each other but located at different positions, the transmission of the rotating force of the rotational body 71 to the cover 3 and the operation of bending the cover 3 are prevented from interfering directly with each other. In other words, the cover 3 that rotates upon receipt of the rotating force of the rotational body 71 is not bent upon directly receiving the rotating force, but the cover 3 is bent while being guided from the cam grooves 341 and 342 when the cover 3 rotates. In this example, the first cover portion 31 has a bent end portion 36 that protrudes in a direction bending relative to a surface length direction 31y of main surfaces (in this example, the main surfaces mean both of a main front surface and a main rear surface behind the main front surface) 31a on the coupling portion 33 side on side surface portions (in this example, both ends in a vehicle right and left direction) of both sides of the main surfaces 31a in a surface width direction 31x (refer to FIG. 3B). The bending direction is a direction in which the cover 3 rotates toward the opened position in the cover 3 (refer to FIG. 4A) that is located in the closed position. The first coupling portion 713 is rotationally coupled to the bent end portion 36.

The surface width directions 31x and 32x of the first cover portion 31 and the second cover portion 32 are directions of 3x1 and 3x2. In this example, the surface width directions 31x and 32x coincide with the extending directions of the rotation axis lines 3x1, 3x2, and 7x. Further, the surface length directions 31y and 32y of the first cover portion 31 and the second cover portion 32 are orthogonal to the surface width directions 31x and 32x on the respective main surfaces (in this example, both of the main front surface and the main rear surface behind the main front surface) 31a and 32a. The surface length directions 31y and 32y are a coupling direction in which the first cover portion 31 and the second cover portion 32 are coupled to each other in a state where the first cover portion 31 and the second cover portion 32 are aligned in a plane (that is, in a state where the angle θ is 0 degrees: refer to FIG. 4A).

Further, the first cover portion 31 and the second cover portion 32 are subjected to a positional movement and an angular change while being guided by the cam grooves 341 and 342 as the guide portion, and the first coupling portion 713 is coupled to any one of the first cover portion 31 and the second cover portion 32 which is smaller in the angular change. In this example, the first coupling portion 713 is coupled to the first cover portion 31.

The second coupling portion 714 extends from each end of the main body portion 710 (more particularly, the rotating shaft portion 711) in the rotation axis line direction 7x of the rotational body 71 in the radial direction (that is, a direction orthogonal to the rotation axis line 7x) described above. The second coupling portion 714 rotates about the rotation axis line 7x in conjunction with the rotation of the main body portion 710 around the rotation axis 7x. In this example, the front end side of the second coupling portion 714 is coupled to the lower end 40 at each end of the combiner 4 in the rotation axis line 7x direction of the rotational body 71 so as to be rotational about the rotation axis line 7x. Each lower end portion 40 of the combiner 4 is a rolling body support portion that supports rolling bodies (in this case, rollers) 4R so as to be rotational on the guide rail portion 2R.

The combiner 4 is rotationally coupled to the second coupling portion 714 of the rotational body 71, and the lower end portion 40 of the combiner 4, which is a coupling portion, is provided with a posture holding unit 40S that returns the combiner 4 to an original posture when the combiner 4 rotates relative to a predetermined posture and is inclined (refer to FIGS. 3A and 3B). In this example, the posture holding unit 40S is a spring member as an urging unit. An inclination angle of the combiner 4 can be adjusted by adjusting the posture holding unit 40S. Even if a load is applied in an inclination rotation direction of the combiner 4, since the posture holding unit 40S absorbs a force of the load, damage to the combiner 4 can be prevented.

Since the second coupling portion 714 swings around the rotation axis line 7x, a movement locus of the second coupling portion 714 is arcuate. On the other hand, a movement locus of the combiner 4 is a non-circular arcuate shape (in this case, a straight line shape). As a result, a distance between the combiner 4 and the rotation axis line 7x is not kept constant at all times during the swinging motion of the main body portion 710. For that reason, the second coupling portion 714 has a distance absorption portion 740 that absorbs a change in a distance between the combiner 4 and the rotation axis line 7x as a motion direction conversion mechanism for converting the swing motion about the rotation axis line 7x into a linear motion of the combiner 4. More specifically, the second coupling portion 714 couples the rotational body 71 to the combiner 4 in the following manner. The second coupling portion 714 pushes out the combiner 4 toward a first side (in this case, an upper side) in the linear movable direction in association with a first-directional rotation around the rotation axis line 7x of the rotational body 71. On the other hand, the second coupling portion 714 pushes out the combiner 4 toward a second side (in this case, a lower side) opposite to the first side in the movable direction in association with a second-directional rotation opposite to the first-directional rotation. The distance absorption portion 740 is a displacement absorption portion that absorbs a displacement approaching or separating from the rotational body 71 (specifically, the rotation axis line 7x) generated in the combiner 4 linearly reciprocating by the above pushout.

The distance absorption portion 740 includes a first sliding portion 741, a second sliding portion 742, and a sliding guide portion 743. The first and second sliding portions 741 and 742 are protrusion portions that protrude from the main body portion 710 in an extension direction of the rotation axis line 7x and are provided side by side at two different positions in the extension direction of the second coupling portion 714. The sliding guide portion 743 allows a reciprocating sliding movement of the sliding portions 741 and 742 along an alignment direction of those sliding portions 741 and 742, that is, the extension direction of the second coupling portion 714, while regulating a movement of the sliding portions 741 and 742 in a circumferential direction of the rotation axis line 7x.

Specifically, the first protrusion portion 741 is each end of the rotating shaft portion 711. The second protrusion portion 742 is provided integrally with each of the opposite frames 712 on each end side of the rotating shaft portion 711 and protrudes outward in the extension direction of the rotation axis line 7x on the combiner 4 side with respect to each end of the rotating shaft portion 711. The second coupling portion 714 has a protrusion frame portion 714R protruding from the opposing frame 712 around the rotation axis line 7x on the combiner 4 side with respect to the rotation shaft portion 711. The second protrusion portion 742 is provided at a front end of the protrusion frame portion 714R. In this example, the protrusion frame portion 714R extends from the combiner 4 side of the opposite frame 712 in a shape following the arc shape of the arcuate frame portion 712R.

The sliding guide portion 743 is an elongated hole portion having an elongated hole 743H that penetrates in the rotation axis line direction 7x of the rotational body 71 and extends in the radial direction (that is, a direction orthogonal to the rotation axis line 7x) described above. Protrusion portions forming the first sliding portion 741 and the second sliding portion 742 are located inside the sliding guide portion 743. The elongated hole 743H allows the protrusions forming the first sliding portion 741 and the second sliding portion 742 which are located inside the elongated hole 743H to move in a longitudinal direction (that is, a direction orthogonal to the rotation axis line 7x of the rotational body 71) of the elongated hole 743H while regulating the movement of the protrusion portions in a short direction (that is, a rotation direction of the rotational body 71) of the elongated hole 743H.

In this example, a worm gear is used for the gear portion 73. A cylindrical worm 73A is assembled in the motor 72 which serves as a driving unit for swinging the rotational body 71 as a drive unit side gear unit for transmitting a rotational output of the motor 72 to a rotating output shaft of the motor 72. On the other hand, the rotational body 71 functions as a worm wheel meshing with the rotational body 71. Specifically, the rotational body 71 has an arcuate portion 715 extending in an arc shape around the rotation axis line 7x on an outer peripheral side of the opposing frame 712. A gear 73B serving as a rotational body side gear portion meshing with a gear of the cylindrical worm 73A is directly provided on an outer peripheral surface of the arcuate portion 715. In this example, in the arcuate portion 715, two coupling frame portions 712r coupled to the arcuate frame portion 712R extend so as to further extend outward from the arcuate frame portion 712R, and front ends of the coupling frame portions 712r are coupled to the arcuate shape. With the gear portion 73, the rotational body 71 can be swung around the rotation axis line 7x by the aid of a rotational output of the motor 72.

Next, the cover 3 will be described in detail.

Figure 5B:
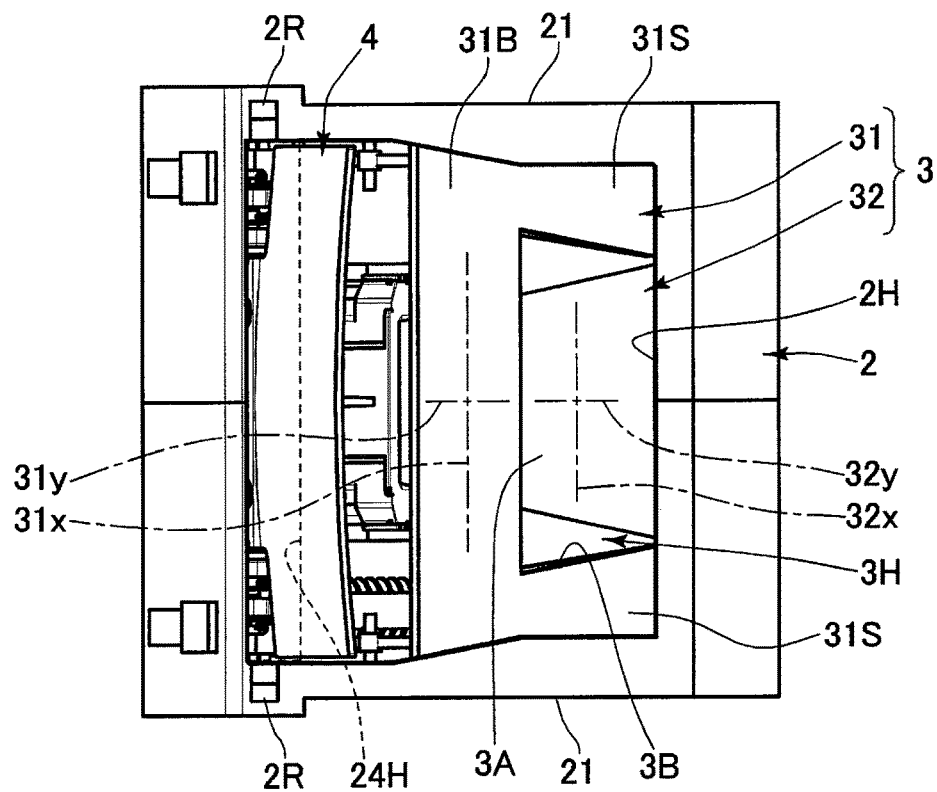
FIG. 5B is a top view showing the head-up display apparatus of FIG. 1 in the state where the cover is opened.

As shown in FIGS. 5A and 5B, the first cover portion 31 is formed with a recess portion 3B having a base end portion 31B and opposite front end portions 31S. The base end portion 31B is a portion forming a bottom side of the recess portion 3B having a concave shape. The opposite front end portions 31S extend in the surface length direction 31y from both end sides of the base end portion 31B in the surface width direction 31x and defines a recessed space of the recess portion 3B between the opposite ends 31S. As shown in FIG. 7A, in this example, the recess portion 3B is formed to be wider so as to exceed an intermediate position of the first cover portion 31 in the surface length direction 31y from an open side of the recess portion 3B. In this example, the opposite front end portions 31S have an oblique shape in which the opposite front end portions 31S approach each other in an opposing direction from the base end portion 31B side toward the front end side. As a result, as shown in FIG. 5B, the through hole 3H forming a passage hole of the light emitted from the display unit 5 and reflected by the reflecting mirror 50 has an inverted trapezoidal opening with a wider upper side than a lower side.

As shown in FIG. 3B, the first cover portion 31 is coupled to the coupling portion 33 forming the rotating shaft portion at an open side end of the recess portion 3B, that is, the tip of the opposite front end portions 31S. In this example, the coupling portion 33 is a linear member which penetrates through both of the plate-shape first cover portion 31 and the plate-shape second cover portion 32 in the surface width direction 31x and 32x.

As shown in FIG. 3B, the first cover portion 31 has a cam pin 351 protruding outward from both ends in the surface width direction 31x at a position corresponding to the base end portion 31B side in the surface length direction 31y of the first cover portion 31. In this example, the cam pin 351 is provided at a position which is located on an opposite side to the opening side of the recess portion 3B from an intermediate position of the first cover portion 31 in the surface length direction 31y. More specifically, the cam pin 351 is provided at a position that is opposite to the open side of the recess portion 3B in the surface length direction 31y.

The second cover portion 32 is formed in a T shape having a base end portion 32B and a protrusion portion 3A. The base end portion 32B is a portion having a wide width in the surface width direction 32x. The protrusion portion 3A is a protrusion that protrudes in the surface length direction 32y from a center of the base end 32B in the surface width direction 32x in such a manner that the width in the surface width direction 32x is narrower than the base end portion 32B. In this example, the protrusion portion 3A has a shape corresponding to the concave shape so as to fill the recessed space of the recess portion 3B. Specifically, the width in the surface width direction 32x increases from the base end portion 32B toward the front end side.

The second cover portion 32 is coupled to the coupling portion 33 at protrusion portion 3A side ends of both end portions 32b of the base end portion 32B in the surface width direction 32x where the protrusion portion 3A is not provided (refer to FIG. 7A).

The second cover portion 32 has a cam pin 352 that protrudes outward from both ends of the base end portion 32B in the surface width direction 32x (refer to FIGS. 4A and 4B). In this example, the cam pin 352 is located at an end of the base end portion 32B on a side opposite to the protrusion portion 3A in the surface length direction 32x. In other words, the cam pin 352 is provided at an end portion of the second cover portion 32 opposite to the first cover portion 31.

As shown in FIG. 6, an end portion 31C of the first cover portion 31 on a side opposite to the open side of the recess portion 3B with respect to the cam pin 351 is a portion that closes the doorway 24H of the combiner 4 when the cover 3 is located at the closed position.

Now, the movement of the cover 3 will be described in detail with reference to FIG. 6.

When the cover 3 moves from the closed position to the opened position, the end portion 31C of the first cover portion 31 moves in such a direction as to quickly move away from the doorway 24H so that the combiner 4 can pass through the doorway 24H of the combiner 4.

Specifically, in at least an initial section of an opening movement of the cover 3 from the closed position toward the opened position, a movement distance of the cam pin 351 (also referred to as the movement distance of the first cover portion 31) is larger in an in-plane direction of the opening 2H (in this case, a direction toward a rear of the vehicle on an opening surface of the opening 2H) for forming the doorway 24H, and the amount of downward movement in which the accommodated position exists is reduced. In this example, the cam groove 341 is formed in a shape that descends in an arcuate shape from an upper side of the rotation axis line 7x toward a direction away from the doorway 24H in not only the initial section but also the entire section.

On the other hand, in the initial section of the opening movement of the cover 3 from the closed position toward the opened position, the cam groove 342 moves the cam pin 352 so that the protrusion portion 3A is displaced upward relative to the recess portion 3B in the first cover portion 31 that is in a plane relative to the second cover portion. Thereafter, in a remaining section where the cover 3 is located ahead of the initial section (in other words, the initial section of the closing movement from the opened position to the closed position), the cover 3 is switched to a shape separating from a circular path 3L through which the rotation axis line 3x1 of the cover 3 passes. As a result, the second cover portion 32 is subjected to a relative rotation around the rotation axis line 3x1 with respect to the first cover portion 31 in such a manner that the protrusion portion 3A displaced upward relative to the recess portion 3B is displaced downward with respect to the recess portion 3B this time. Thereafter, the downward displacement of the protrusion portion 3A with respect to the recess portion 3B is enlarged, and an angular difference between the first cover portion 31 and the second cover portion reaches the opened position forming an angle θB. Conversely, when the cover 3 moves from the opened position to the closed position, the cover 3 performs the operation opposite to the above operation.

As described above, since the first cover portion 31 and the second cover portion 32 are accommodated in the apparatus housing 2 in such a manner that the first cover portion 31 and the second cover portion 32 are bent when using the head-up display apparatus 1, a movable range of the cover 3 including the first cover portion 31 and the second cover portion 32 can be reduced more than that in the conventional art. However, when designing the head-up display apparatus in which the first cover portion and the second cover portion are bent and accommodated in the apparatus housing, it is usual that a region sandwiched between the first cover portion and the second cover portion in the bent state, which are accommodated in the apparatus housing causes a large dead space and becomes useless. However, in the head-up display apparatus 1, the first cover portion 31 and the second cover portion 32 are bent so that the through hole 3H is formed in the cover 3. Then, a region 3S (refer to FIG. 6) sandwiched between the first cover portion 31 and the second cover portion 32 in a bent state is used as a passage path of an image light emitted from the display unit 5. Specifically, the image light that passes through the region 3S sandwiched between the first cover portion 31 and the second cover portion 32 in the bent state can be emitted outside the region 3S through the through hole 3H defined by the first cover portion 31 and the second cover portion 32, which are in the bent state. Therefore, the dead space can be effectively leveraged. In addition, the dead space is leveraged as a space through which the second cover portion 32 passes (that is, a movable area of the second cover portion 32). In this way, the other space in the apparatus housing 2 can be omitted as large as the dead space is leveraged, and the build of the apparatus housing 2 can be reduced more than that in the conventional head-up display.

In addition, the head-up display apparatus 1 performs both of the position movement between the opened position and the closed position of the cover 3 and the position movement between the display position and the accommodated position of the combiner 4 by the swinging motion of the rotational body 71 at the same time. In other words, the control unit 8 does not need to control the driving of the respective driving sources provided in the cover 3 and the combiner 4, but may control the driving of only the driving source (in this example, the motor 72) that rotates the rotational body 71. Normally, the driving source corresponding to each of the cover and the combiner is provided, and the driving of the cover and the combiner is controlled. In that case, a complicated control or mechanism is required such that the movement of the cover from the closed position to the opened position is first started to ensure the doorway of the combiner, and the movement of the combiner from the accommodated position to the display position is started at a next timing. However, in the head-up display apparatus 1, there is no need for such a control or mechanism as to shift the timing, and when the rotational body 71 is rotated, the opening motion of the cover 3 and the movement of the combiner 4 to the display position are performed at the same time in such a manner that the cover 3 and the combiner 4 do not collide with each other. In addition, because the combiner 4 and the cover 3 which are coupled to the rotational body 71 rotate relative to each other while maintaining a mutual positional relationship even if the rotational body 71 rotates, the combiner 4 and the cover 3 do not interfere with each other. As described above, in the head-up display apparatus 1, the movable mechanism 7 for moving both of the cover 3 and the combiner 4 is realized in a simple manner with the use of the rotational body 71. Also, the drive control of the motor 72 as the driving source is also very simple, and there is no complicated element.

The above embodiment is merely an example. The present disclosure is not limited to the above embodiment, but variation modifications such as addition and omission can be performed based on the knowledge of one skilled in the art without departing from the spirit of the claims.

Other embodiments and modifications will be described below. The same reference numerals are given to the same parts as those in the above embodiment, and a description of the same parts will be omitted. Incidentally, the embodiment described above and embodiments and modifications described below can be implemented in combination as appropriate insofar as technical contradiction does not occur.

In the embodiment described above, one of a coupling body that is coupled to the rotational body 71 on the first side in the radial direction including the combiner 4 and a coupling body that is coupled to the rotational body 71 on the second side in the radial direction including the cover 3 can be set to be heavier than the other coupling body. With the above configuration, vibration and gear rattle can be prevented. In addition, an effect of assisting the rotation operation of the rotational body 71 in any one of the first rotation direction and the second rotation direction can be obtained.

Conversely, in the embodiment described above, a weight can be balanced between the coupling body that is coupled to the rotational body 71 on the first side in the radial direction including the combiner 4 and the coupling body that is coupled on the second side in the radial direction including the cover 3. In that case, particularly when the movable direction is the vertical direction of the vehicle, since the weights of both the two coupling bodies are balanced with each other, a torque and a size of the motor can be reduced and a strength of a member that transmits the rotational output of the motor can also be reduced, thereby being capable of reducing the cost.

In the embodiment described above, an angle detection unit that detects the rotation angle of the rotational body 71 can be provided on the rotational body 71. The detection result of the angle detection unit may be input to the control unit 8 and the control unit 8 may execute a speed control of the rotational body 71. This makes it possible to adjust the opening and closing speed of the cover 3 and the moving speed of the combiner 4.

Figure 8A:
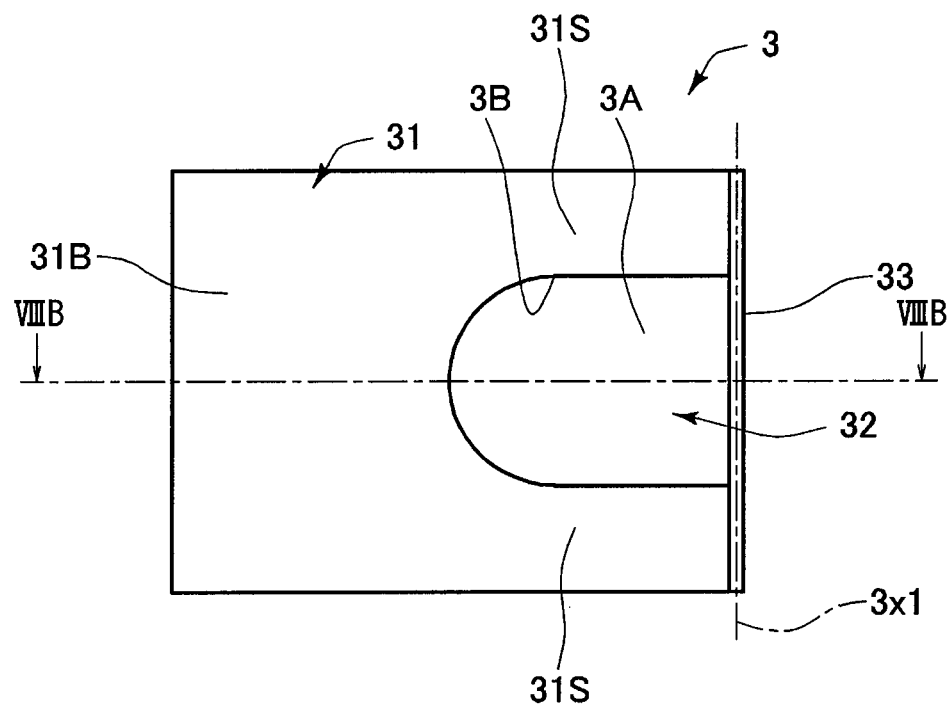
FIG. 8A is a diagram schematically showing a cover in a closed state in a first modification of the head-up display apparatus of FIG. 1.

In the embodiment described above, as shown in FIG. 7A, the recess portion 3B of the cover 3 forms a rectangular recessed space, and a bottom side of the recessed space has a straight shape. On the other hand, the shape of the recess portion 3B may be changed. For example, as shown in FIG. 8A, the bottom side of the recessed space may have a curved surface.

In the embodiment of FIG. 7A, the cover 3 is shaped such that the second cover portion 32 has the protrusion portion 3A and the base end portion 32B, but the cover 3 may be changed into another shape as long as the second cover portion 32 is shaped to have at least a closing portion for closing the recessed space of the recess portion 3B of the first cover portion 31. For example, as shown in FIG. 8A, the second cover portion 32 may be formed of at least only the closing portion 3A that closes the recessed space of the recess portion 3B of the first cover portion 31.

Figure 8B:
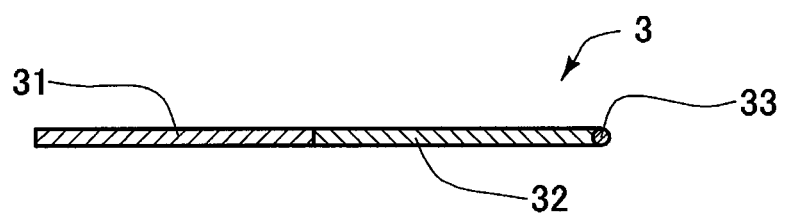
FIG. 8B is a cross-sectional view taken along a line VIIIB-VIIIB of FIG. 8A.
Figure 8C:
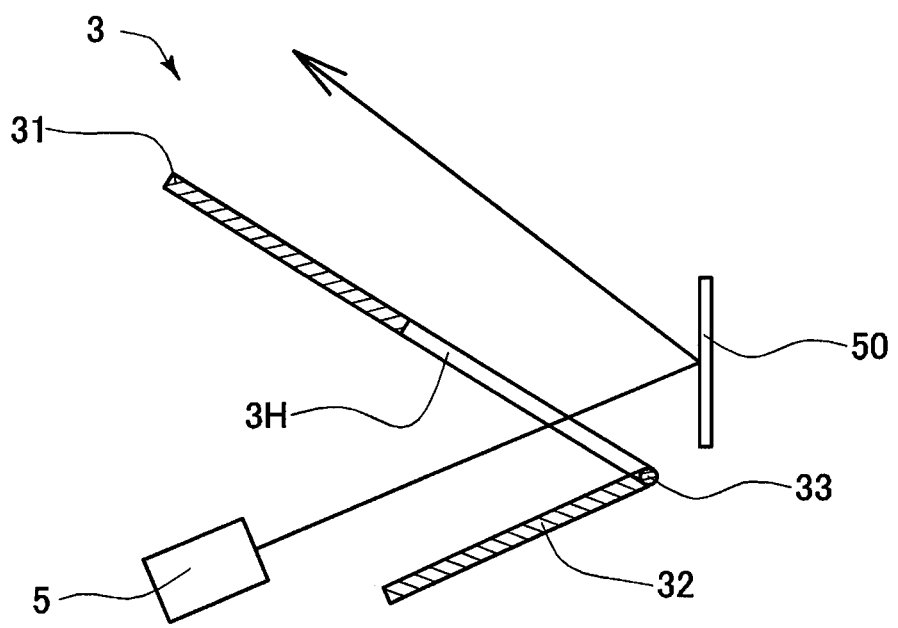
FIG. 8C is a diagram showing the cover of FIG. 8B which is in an opened state.
Figure 9A:
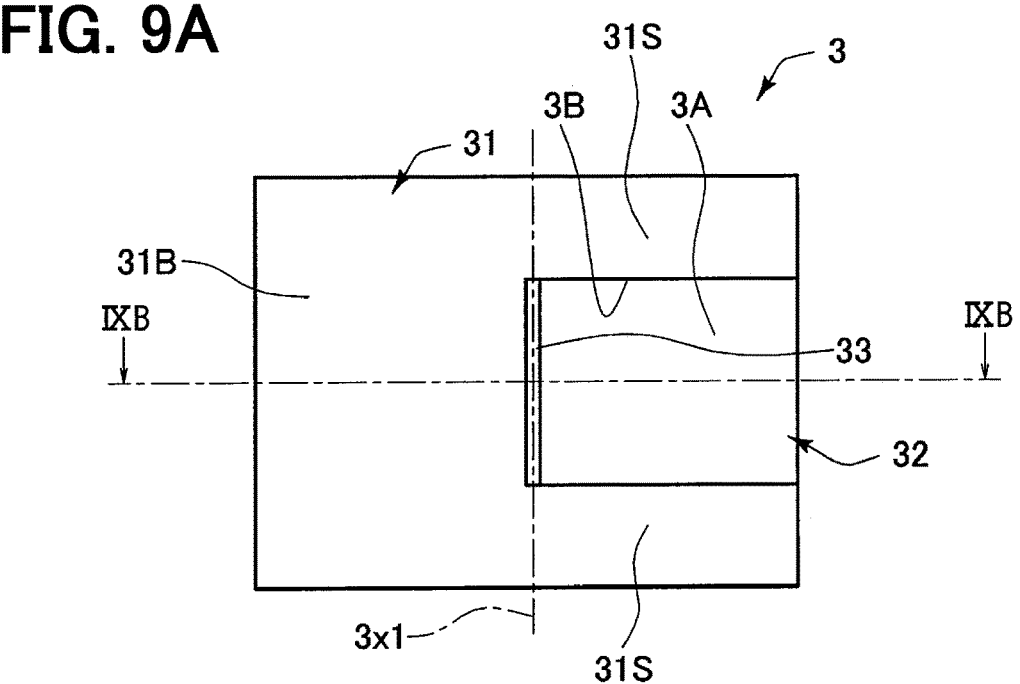
FIG. 9A is a diagram schematically showing a cover in a closed state in a second modification of the head-up display apparatus of FIG. 1.
Figure 9B:
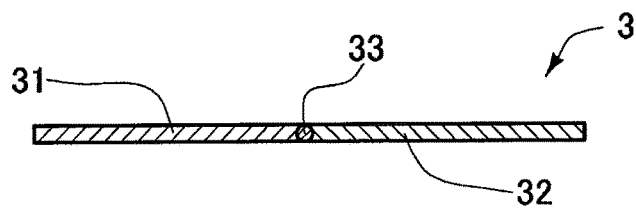
FIG. 9B is a cross-sectional view taken along a line IXB-IXB of FIG. 9A.
Figure 9C:
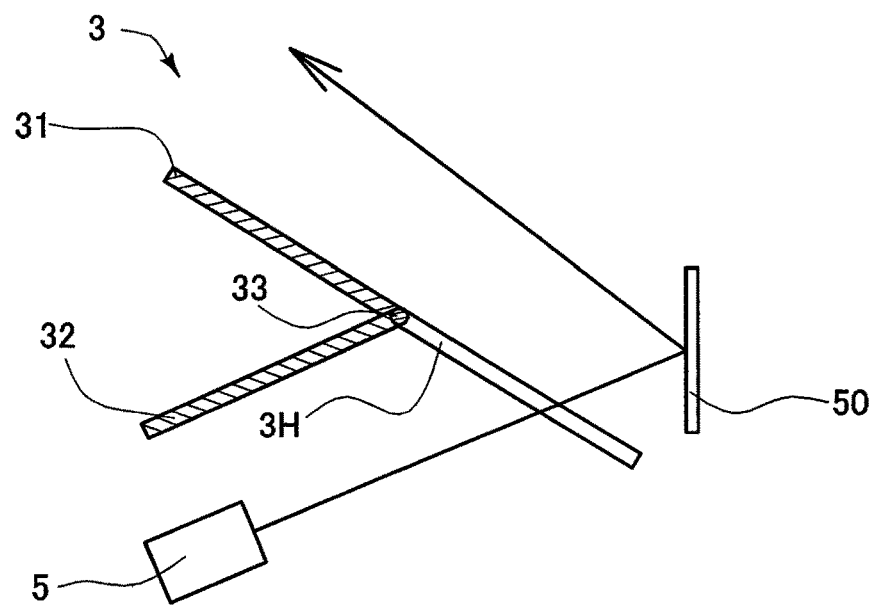
FIG. 9C is a diagram showing the cover of FIG. 9B which is in an opened state.

In the embodiment of FIG. 7A, in the cover 3, the coupling portion 33 is provided at a position except for both ends of the first cover portion 31 and the second cover portion 32 aligned in a plane in an alignment direction. However, for example, as shown in FIG. 8A, the coupling portion 33 can be provided at an end portion of the second cover portion 32 side in the alignment direction, in the first cover portion 31 and the second cover portion 32 aligned in a plane. In that case, the angle of the cover 3 can be changed as shown in FIGS. 8B and 8C. Further, for example, as shown in FIG. 9A, the coupling portion 33 can be provided at an end portion of the first cover portion 31 side in the alignment direction, in the first cover portion 31 and the second cover portion 32 aligned in a plane, that is, at a position which is a bottom of the recess portion 3B. In that case, the angle of the cover 3 can be changed as shown in FIGS. 9B and 9C. Further, in that case, light from the display unit 5 passes through a lower side of the second cover portion 32 as shown in FIG. 9C.

Figure 10:
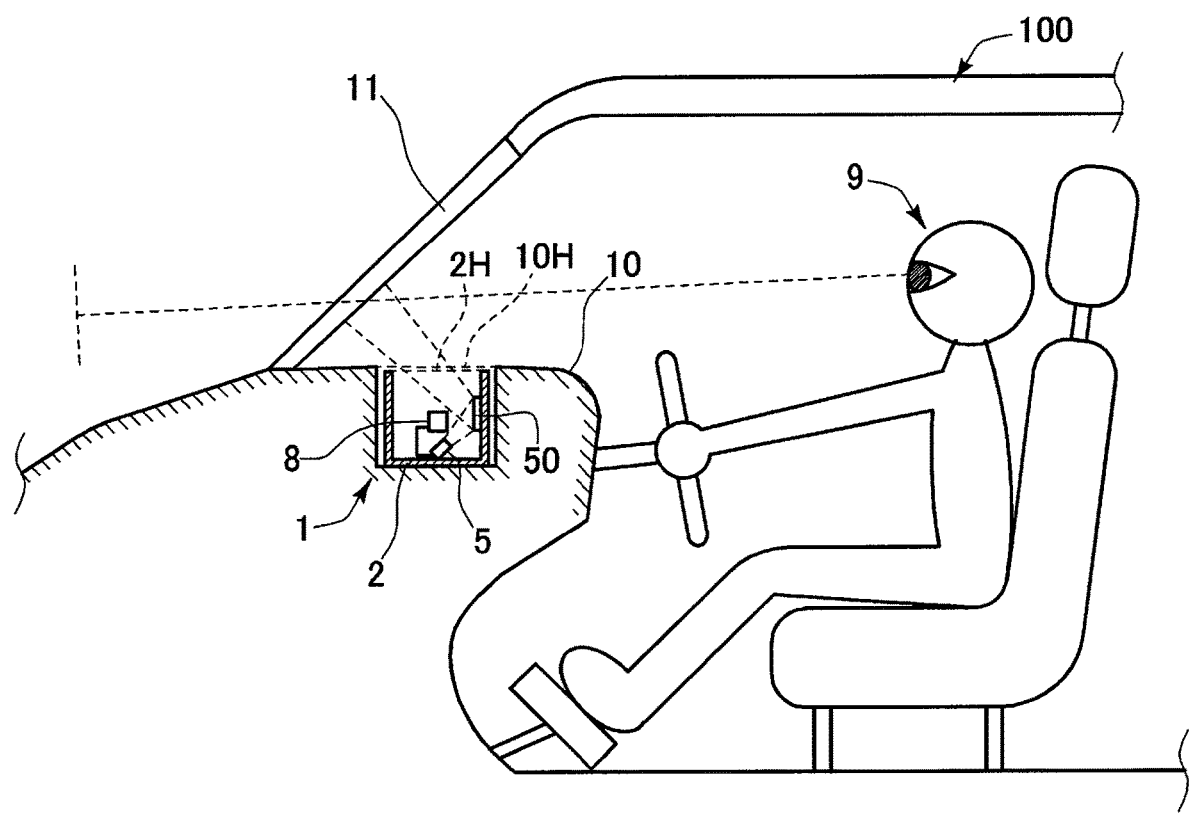
FIG. 10 is a diagram schematically showing a configuration of a third modification of the head-up display apparatus and a placement of the head-up display apparatus in a vehicle interior.

In the embodiment described above, the cover 3 forming the through hole 3H by bending is applicable to not only the head-up display apparatus 1 having the combiner 4 but also a head-up display apparatus without using a dedicated display member such as the combiner 4, for example, a head-up display apparatus 1 for projecting light forming a display image onto the front window 11 as shown in FIG. 10.

Figure 11A:
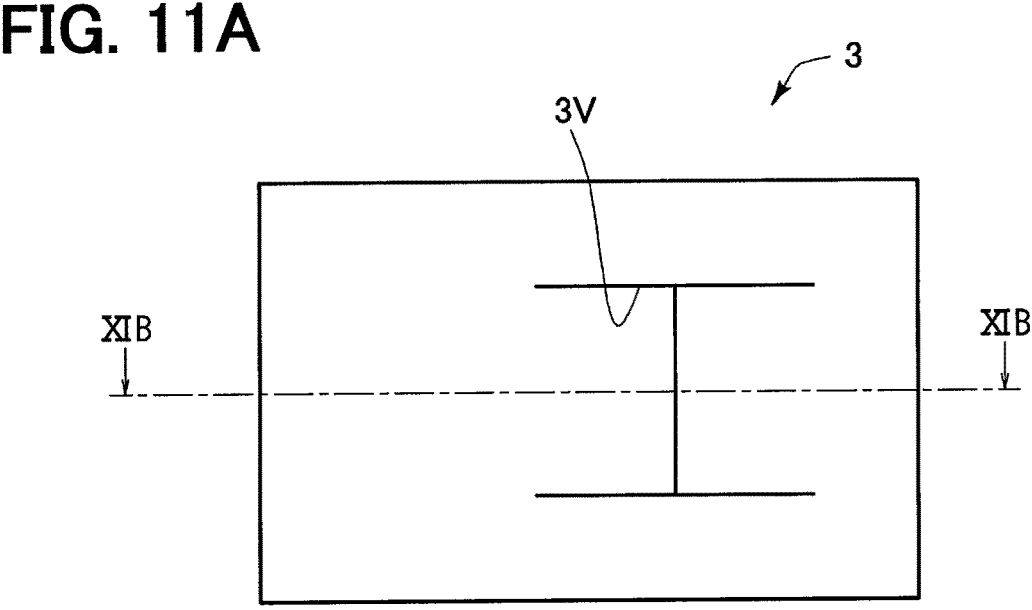
FIG. 11A is a diagram schematically showing a cover in a closed state in a fourth modification of the head-up display apparatus of FIG. 1.
Figure 11B:
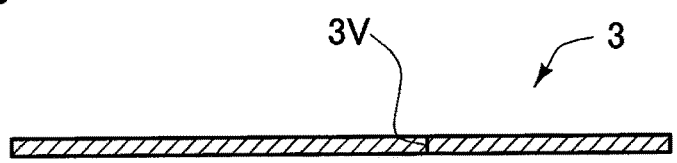
FIG. 11B is a cross-sectional view taken along a line XIB-XIB in FIG. 11A.
Figure 11C:
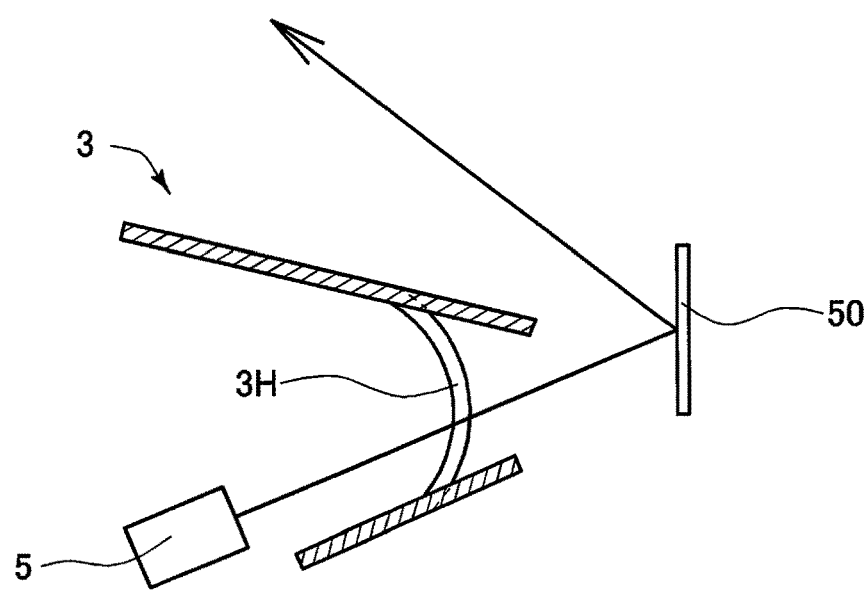
FIG. 11C is a diagram showing the cover of FIG. 11B which is in an opened state.

In the embodiment described above, the cover 3 may be formed of a plate-shape elastic member whose second side opposite to a first side is bent relative to the first side. In that case, in order to provide the through hole 3H when the cover 3 is bent, there is a need to provide a notch 3V penetrating in a thickness direction of the cover 3, which is a plate-shape elastic member. For example, the cover 3 is formed of the plate-shape elastic member as shown in FIG. 11A, and an H-shaped notch 3V is formed in the cover 3 in advance. In a planar state where the cover 3 is not bent as shown in FIG. 11B, although the notch 3V is present, the through hole 3H is not formed. However, in the state where the cover 3 is bent as shown in FIG. 11C, the through hole 3H is formed by the notch 3V. A shape of the notch 3V may be another shape as long as the through hole 3H can be formed when the cover 3 is bent.

The head-up display apparatus described above includes a display unit, a cover, a movable mechanism, and a bending unit. The display unit projects a display image passing through the opening of the apparatus housing from the inside of the apparatus housing onto a display member located outside the apparatus housing. The cover can provide a through hole by bending the second side opposite to the first side relative to the first side. The movable mechanism moves the cover between a closed position where the opening of the apparatus housing is closed and an opened position where the opening is opened. When the cover is located at the closed position, the bending unit holds the cover in a state where the through hole is not formed. When the cover moves from the closed position to the opened position, the bending unit changes the cover from a state where the through hole is not formed to a state where the through hole is formed, by bending the cover. When the cover is located at the opened position, the bending unit holds the cover in a state where the through hole is formed. When the cover moves from the opened position to the closed position, the bending unit changes the cover from the state where the through hole is formed to the state where the through hole is not formed, by eliminating or relaxing the bending of the cover.

According to the configuration described above, since the cover is accommodated in the apparatus housing in the state where the cover is bent at the time of use, the build of the apparatus can be reduced more than that in the conventional art. However, when considering a configuration in which the cover is accommodated in the apparatus housing in the state where the second side is bent relative to the first side, usually, a region sandwiched between the first side and the second side of the cover in the bent state accommodated in the apparatus housing causes a large dead space, and becomes useless.

However, according to the configuration described above, since the through hole is formed in the cover by bending, the region sandwiched between the first side and the second side of the cover which is in the bent state can be set to the passage path of the image light emitted from the display unit. In other words, since the image light passing through the region sandwiched between the first side and the second side of the cover that is in the bent state can be emitted outside the region through the through hole formed in the cover which is in the bent state, the dead space can be effectively leveraged as the passage path of the light. In this way, the other space in the apparatus housing can be omitted as large as the dead space is leveraged, and the build of the apparatus housing can be reduced more than that in the conventional head-up display.

The head-up display apparatus described above includes a combiner, a display unit, a cover, a rotational body, and a drive unit. The combiner is movable between the accommodated position at which the combiner is accommodated in the apparatus housing and the display position at which the combiner is outside the apparatus housing and visible to the user. The display unit projects the light to form the display image passing through the opening of the housing from the inside of the apparatus housing onto the combiner located at the display position. The cover is movable between a closed position, at which the doorway of the combiner in the apparatus housing and the housing opening are closed, and an opened position, at which the doorway and the housing opening are opened. The rotational body is provided so as to be rotational about a predetermined rotation axis line. The rotational body is coupled to the combiner and the cover at different positions around the rotation axis line. The rotational body is swingable around the rotation axis line between a predetermined first angular position where the combiner is located at the display position and the cover is located at the opened position, and a predetermined second angular position where the combiner is located at the accommodated position and the cover is located at the closed position. The drive unit causes the rotational body to swing between the first angular position and the second angular position.

According to the configuration described above, both of the position movement between the opened position and the closed position of the cover and the position movement between the display position and the accommodated position of the combiner are executed by the swinging motion of the rotational body at the same time. Therefore, there is no need to control the driving of the respective driving sources provided in the cover and the combiner, and the driving of only the driving source that rotates the rotational body may be controlled.

In addition, because the cover and the combiner which are coupled to the rotational body rotate relative to each other while maintaining a mutual positional relationship even if the rotational body rotates, the cover and the combiner do not interfere with each other. Therefore, there is no need to provide a control or mechanism for shifting the movement start timing of the cover and the movement start timing of the combiner from each other. The movable mechanism for moving both of the cover and the combiner is realized by a simple mechanism having the rotational body, and the driving control of the rotational body is also performed by a simple control for merely swinging the rotational body.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display apparatus comprising:
  a display unit configured to project a display image on a display member, which is located outside an apparatus housing, from an inside of the apparatus housing through an opening of the apparatus housing;
  a cover configured to bend to form a through hole in the cover;
  a movable mechanism configured to move the cover between a closed position, in which an opening of the apparatus housing is closed, and an opened position, in which the opening is opened; and
  a bending unit, wherein
  when the cover is in the closed position, the bending unit is configured to hold the cover in a state, in which the through hole is not formed,
  when the cover moves from the closed position to the opened position, the bending unit is configured to bend the cover to change the cover from the state, in which the through hole is not formed, to a state, in which the through hole is formed,
  when the cover is in the opened position,
    the bending unit is configured to hold the cover in the state where the through hole is formed and
    the cover is bent and is accommodated inside the apparatus housing, and
  when the cover moves from the opened position to the closed position, the bending unit is configured to eliminate or to alleviate the bend of the cover to change the cover from the state, in which the through hole is formed, to the state, in which the through hole is not formed.

2. The head-up display apparatus according to claim 1, wherein
  the cover includes a first cover portion and a second cover portion,
  the second cover portion is coupled to the first cover portion to be rotational about a predetermined rotation axis line, and
  the second cover portion is configured
    to form a through hole when an angle between the first cover portion and the second cover portion is at a predetermined open angle about the rotation axis line to cause an angular difference and
    to close the through hole when the angle is at a predetermined closed angle.

3. The head-up display apparatus according to claim 2, wherein
  the bending unit includes:
    a closed angle holding portion configured to hold the first cover portion and the second cover portion at the closed angle when the cover is at the closed position;
    an open angle holding portion configured to hold the first cover portion and the second cover portion at the open angle when the cover is at the opened position; and
    an angular transformation unit configured
      to relatively rotate the first cover portion and the second cover portion about the rotation axis line to change the angle between the first cover portion and the second cover portion from the closed angle to the open angle when the cover moves from the closed position to the opened position, and
      to relatively rotate the first cover portion and the second cover portion about the rotation axis line to change the angle between the first cover portion and the second cover portion from the open angle to the closed angle when the cover moves from the opened position to the closed position.

4. The head-up display apparatus according to claim 3, wherein
  in a state where the first cover portion and the second cover portion are at the closed angle therebetween, one of the first cover portion and the second cover portion has a recess portion, and the other has a closing portion that enters an inside of the recess portion, and
  the angular transformation unit is configured to displace the recess portion and the closing portion in a rotational direction of the recess portion and the closing portion to form the through hole when the first cover portion and the second cover portion rotate about the rotation axis line to cause a change from the closed angle to the open angle and to cause the closing portion to close the through hole formed inside the recess portion when the first cover portion and the second cover portion rotate about the rotation axis line to cause a change from the open angle to the closed angle.

5. The head-up display apparatus according to claim 4, wherein
  the through hole inside the recess portion in the cover is covered with the closing portion in a state where the first cover portion and the second cover portion are aligned in a plane, and
  the cover includes a coupling portion, which rotationally couples the first cover portion to the second cover portion and is located on a side of an end of the second cover portion in an alignment direction of the first cover portion and the second cover portion.

6. The head-up display apparatus according to claim 4, wherein
the through hole inside the recess portion in the cover is covered with the closing portion in a state where the first cover portion and the second cover portion are aligned in a plane, and
the cover includes a coupling portion, which rotationally couples the first cover portion to the second cover portion and is located at a position of a bottom of the recess portion in an alignment direction of the first cover portion and the second cover portion.

7. The head-up display apparatus according to claim 4, wherein
the through hole inside the recess portion in the cover is covered with the closing portion in a state where the first cover portion and the second cover portion are aligned in a plane, and
the cover includes a coupling portion, which rotationally couples the first cover portion to the second cover portion and is located between a position of a bottom of the recess portion and an end portion on a side of the second cover portion in an alignment direction of the first cover portion and the second cover portion.

8. The head-up display apparatus according to claim 1, wherein
the cover is a plate-shape elastic member in which a second side opposite to a first side is bendable relative to the first side, and
the cover has a notch portion configured to form the through hole when the cover is bent.

9. The head-up display apparatus according to claim 1, wherein
the cover and the combiner are separate and distinct components entirely spaced apart from each other.

10. The head-up display apparatus according to claim 9, wherein
the cover includes a first cover portion, a second cover portion and a coupling portion,
the coupling portion couples the first cover portion to the second cover portion,
the first cover portion is rotational relative to the second cover portion about a predetermined rotation axis line of the coupling portion, and
when the cover is in the opened position, the coupling portion is accommodated inside the apparatus housing.

11. The head-up display apparatus according to claim 10, wherein
when the cover is in the opened position, the cover is entirely accommodated inside the apparatus housing.

12. The head-up display apparatus according to claim 1, wherein
when the cover is in the opened position, the cover is fully accommodated inside the apparatus housing.

13. A head-up display apparatus, comprising:
a combiner movable between an accommodated position, at which the combiner is accommodated in an apparatus housing, and a display position, at which the combiner is outside the apparatus housing and visible to a user;
a display unit configured to project light from an inside of the apparatus housing through a housing opening to form a display image on the combiner, which is at the display position;
a cover movable between a closed position, in which a doorway of the combiner in the apparatus housing and the housing opening are closed, and an opened position, in which the doorway and the housing opening are opened;
a rotational body; and
a drive unit, wherein
the rotational body is rotational about a predetermined rotation axis line,
the combiner and the cover are rotationally coupled to the rotational body at different positions around the rotation axis line,
the rotational body is swingable about the rotation axis line between a predetermined first angular position and a predetermined second angular position,
at the predetermined first angular position, the combiner is located at the display position, and the cover is located at the opened position,
at the predetermined second angular position, the combiner is located at the accommodated position, and the cover is located in the closed position,
the drive unit is configured to swing the rotational body between the first angular position and the second angular position, and
the cover and the combiner are separate and distinct components spaced apart from each other.

14. The head-up display apparatus according to claim 13, wherein
the combiner is located on a first side in a radial direction orthogonal to the rotation axis line,
the cover is located on a second side in the radial direction opposite to the first side in the radial direction,
when the rotational body located at the first angular position performs a first-directional rotation toward the second angular position, the rotational body is configured to move the combiner toward the first side in the predetermined movable direction to move the combiner from the accommodated position to the display position and to move the cover toward the second side opposite to the first side in the movable direction to move the cover from the closed position to the opened position, and
when the rotational body located at the second angular position performs a second-directional rotation opposite to the first-directional rotation toward the second angular position, the rotational body is configured to move the combiner toward the second side in the movable direction from the display position to the accommodated position and to move the cover toward the first side in the movable direction from the opened position to reach the closed position.

15. The head-up display apparatus according to claim 14, wherein
the movable direction is a vertical direction.

16. The head-up display apparatus according to claim 14, wherein
the first side of the head-up display apparatus in the radial direction includes the combiner,
the second side of the head-up display apparatus in the radial direction includes the cover, and
one of the first side and the second side is heavier than the other.

17. The head-up display apparatus according to claim 14, wherein
a weight is balanced between the first side in the radial direction including the combiner and the second side in the radial direction including the cover.

18. The head-up display apparatus according to claim 14, further comprising:
a guide portion configured to guide the combiner to cause the combiner to move back and forth between the first side and the second side in the predetermined movable direction along a predetermined combiner movement route; and
a coupling portion coupling the rotational body with the combiner to push out the combiner toward the first side in the movable direction with the first-directional rotation of the rotational body and to push out the combiner toward the second side in the movable direction with the second-directional rotation, wherein
the coupling portion includes a displacement absorption portion configured to absorb a displacement approaching or separating from the rotation axis line caused in the combiner due to the pushout.

19. The head-up display apparatus according to claim 13, wherein
the rotational body is configured to start both of the movement of the combiner from the accommodated position to the display position and the movement of the cover from the closed position to the opened position at the same time of starting the first-directional rotation from the first angular position toward the second angular position, and
the rotational body is configured to start both of the movement of the combiner from the display position to the accommodated position and the movement of the cover from the opened position to the closed position at the same time of starting the second-directional rotation opposite to the first-directional rotation from the second angular position.

20. The head-up display apparatus according to claim 13, wherein
the drive unit includes a drive unit side gear portion configured to transmit a rotational output of the driving source,
the rotational body has an arcuate portion extending in a circular arc shape around the rotation axis line, and
the arcuate portion includes a rotational body side gear portion that meshes with the drive unit side gear portion to rotate about the rotation axis line by the rotational output of the driving source.

21. The head-up display apparatus according to claim 13, wherein
one end of the combiner is linearly movable between the accommodated position and the display position.

22. The head-up display apparatus according to claim 21, further comprising:
a guide rail portion linearly extending in a vertical direction and guiding the one end of the combiner.

23. The head-up display apparatus according to claim 13, wherein
the cover and the combiner are entirely spaced apart from each other.

24. A head-up display apparatus comprising:
a display unit configured to project a display image on a display member, which is located outside an apparatus housing, from an inside of the apparatus housing through an opening of the apparatus housing;
a cover configured to bend to form a through hole in the cover;
a movable mechanism configured to move the cover between a closed position, in which an opening of the apparatus housing is closed, and an opened position, in which the opening is opened; and
a bending unit, wherein
when the cover is in the closed position, the bending unit is configured to hold the cover in a state, in which the through hole is not formed,
when the cover moves from the closed position to the opened position, the bending unit is configured to bend the cover to change the cover from the state, in which the through hole is not formed, to a state, in which the through hole is formed,
when the cover is in the opened position,
the bending unit is configured to hold the cover in the state where the through hole is formed,
when the cover moves from the opened position to the closed position, the bending unit is configured to eliminate or to alleviate the bend of the cover to change the cover from the state, in which the through hole is formed, to the state, in which the through hole is not formed,
the cover is a plate-shape elastic member in which a second side opposite to a first side is bendable relative to the first side, and
the cover has a notch portion configured to form the through hole when the cover is bent.

* * * * *